United States Patent
Briscoe et al.

(10) Patent No.: US 8,756,907 B2
(45) Date of Patent: Jun. 24, 2014

(54) CHAIN AND COUPLING LINKS

(75) Inventors: Terry L. Briscoe, Portland, OR (US); Christopher M. Carpenter, Tualatin, OR (US); Michael Rose, Farmington, NM (US); Sean T. Hirtle, Roseburg, OR (US); Charles G. Ollinger, IV, Portland, OR (US)

(73) Assignee: ESCO Corporation, Portland, OR (US)

(*) Notice: Subject to any disclaimer, the term of this patent is extended or adjusted under 35 U.S.C. 154(b) by 0 days.

(21) Appl. No.: 13/597,677

(22) Filed: Aug. 29, 2012

(65) Prior Publication Data

US 2013/0227927 A1 Sep. 5, 2013

Related U.S. Application Data

(60) Provisional application No. 61/529,223, filed on Aug. 30, 2011.

(51) Int. Cl.
*F16G 15/04* (2006.01)
(52) U.S. Cl.
USPC ........................ 59/85; 59/86; 59/78
(58) Field of Classification Search
USPC ................ 59/78, 84, 85, 86, 87, 88; 198/851
See application file for complete search history.

(56) References Cited

U.S. PATENT DOCUMENTS

| | | | |
|---|---|---|---|
| 271,141 A | 1/1883 | Simons | |
| 418,812 A | 1/1890 | McIntire | |
| 523,441 A | 7/1894 | Rae | |
| 547,642 A | 10/1895 | King | |
| 819,007 A | 4/1906 | Dresler | |
| 851,619 A | 4/1907 | Dresler | |
| 859,082 A | 7/1907 | Kenter | |
| 1,144,411 A | 6/1915 | Hamachek | |
| 1,386,732 A | 8/1921 | Reid | |
| 1,513,729 A | 11/1924 | Adams | |
| 1,672,867 A | 6/1928 | Bazeley | |
| 1,776,515 A | 9/1930 | Leahy | |
| 1,787,926 A | 1/1931 | Allen | |
| 1,980,126 A | 11/1934 | Williams | |
| 2,116,875 A | 5/1938 | Barnes | |
| 2,175,504 A | 10/1939 | Ehmann | |
| 2,382,344 A | 8/1945 | St. Pierre | |
| 2,398,897 A | 4/1946 | St. Pierre | |
| 2,525,724 A | 10/1950 | Robbins | |
| 2,537,405 A | 1/1951 | Gilbert | |
| 2,621,471 A | 12/1952 | Dock | |
| 2,761,275 A | 9/1956 | Robbins | |
| 2,819,586 A | 1/1958 | St. Pierre | |
| 2,979,886 A | 4/1961 | Robbins | |
| 3,028,725 A * | 4/1962 | Stevens | 59/84 |
| 3,055,168 A * | 9/1962 | Towry | 59/84 |

(Continued)

FOREIGN PATENT DOCUMENTS

| | | | |
|---|---|---|---|
| AU | 646366 B2 * | 2/1994 | |
| DE | 3149970 | 7/1983 | |
| GB | 2137722 | 10/1984 | |

*Primary Examiner* — David B Jones
(74) *Attorney, Agent, or Firm* — Steven P. Schad

(57) ABSTRACT

A coupling link for connecting two parts together includes link components (which each form a partial link) that are joined together with a removable support. The support and link components are coupled together to withstand high loads and/or adverse wear conditions. The inventive construction is strong, durable, efficient, cost effective and easy to use. Wear caps are provided to facilitate extended usable chain life.

59 Claims, 20 Drawing Sheets

(56) References Cited

U.S. PATENT DOCUMENTS

| | | | | |
|---|---|---|---|---|
| 3,403,506 | A | 10/1968 | Robbins | |
| 3,404,528 | A | 10/1968 | Dicus | |
| 3,453,822 | A | 7/1969 | Crook | |
| 3,603,078 | A | 9/1971 | Schwiebert et al. | |
| 3,732,688 | A | 5/1973 | Horvath | |
| 3,739,571 | A * | 6/1973 | Lashar, Jr. | 59/84 |
| 3,906,716 | A | 9/1975 | Dock | |
| 4,056,929 | A | 11/1977 | Chrobak et al. | |
| 4,114,467 | A * | 9/1978 | Petershack | 198/851 |
| 4,418,526 | A | 12/1983 | Clement | |
| 4,428,187 | A | 1/1984 | Bruce | |
| 4,473,365 | A | 9/1984 | Lapeyre | |
| 4,501,447 | A | 2/1985 | Tatton et al. | |
| 4,505,103 | A * | 3/1985 | Dalferth et al. | 59/85 |
| 4,590,758 | A | 5/1986 | Hannig et al. | |
| 4,606,188 | A | 8/1986 | Osnes et al. | |
| 4,706,451 | A | 11/1987 | Stromberg et al. | |
| 4,815,270 | A | 3/1989 | Lapeyre | |
| 5,042,244 | A * | 8/1991 | Worsley | 59/78 |
| 5,249,415 | A * | 10/1993 | Frenker-Hackfort | 59/78.1 |
| 5,873,232 | A | 2/1999 | Bruce | |
| 5,878,565 | A | 3/1999 | Grootveld | |
| 5,974,779 | A | 11/1999 | Orscheln et al. | |
| 5,983,620 | A | 11/1999 | Amoss | |
| 6,021,634 | A | 2/2000 | Brodziak | |
| 6,216,434 | B1 | 4/2001 | Dalferth et al. | |
| 6,216,435 | B1 * | 4/2001 | Bogdan et al. | 59/85 |
| 6,220,011 | B1 | 4/2001 | Dalferth et al. | |
| 6,223,517 | B1 | 5/2001 | Bogdan et al. | |
| 6,272,837 | B1 | 8/2001 | Martinez | |
| 6,679,648 | B2 | 1/2004 | Benecke | |
| 6,945,388 | B2 * | 9/2005 | Schumacher | 198/851 |
| 7,024,849 | B2 | 4/2006 | Benecke et al. | |
| 7,155,895 | B2 | 1/2007 | Moehnke et al. | |
| 7,251,923 | B2 | 8/2007 | Nuding | |
| 7,263,821 | B2 | 9/2007 | Nuding et al. | |
| 7,546,726 | B1 * | 6/2009 | Wu | 59/78 |
| 7,690,183 | B2 | 4/2010 | Mulle | |
| 2010/0037585 | A1 | 2/2010 | Mülle et al. | |

* cited by examiner

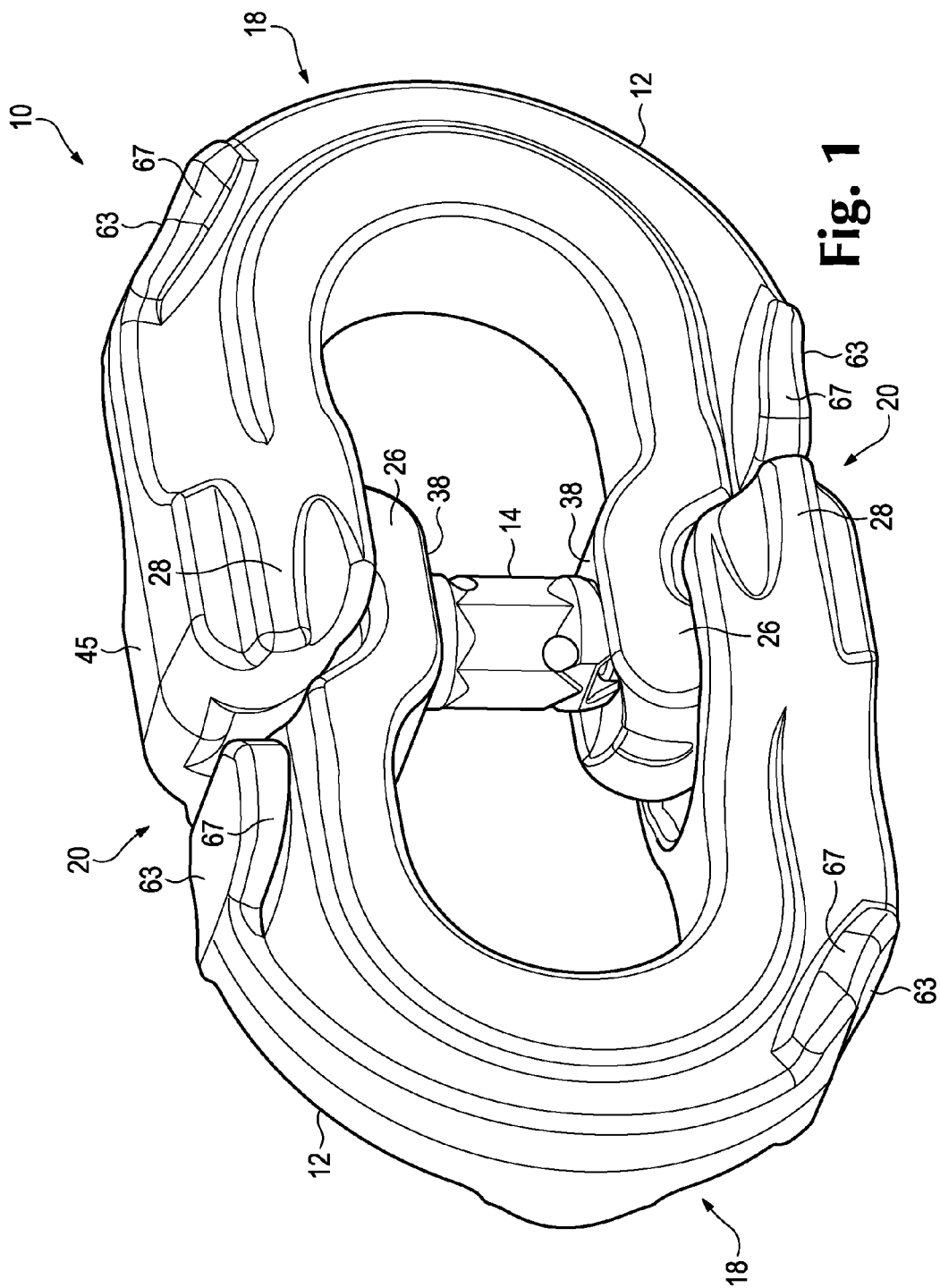

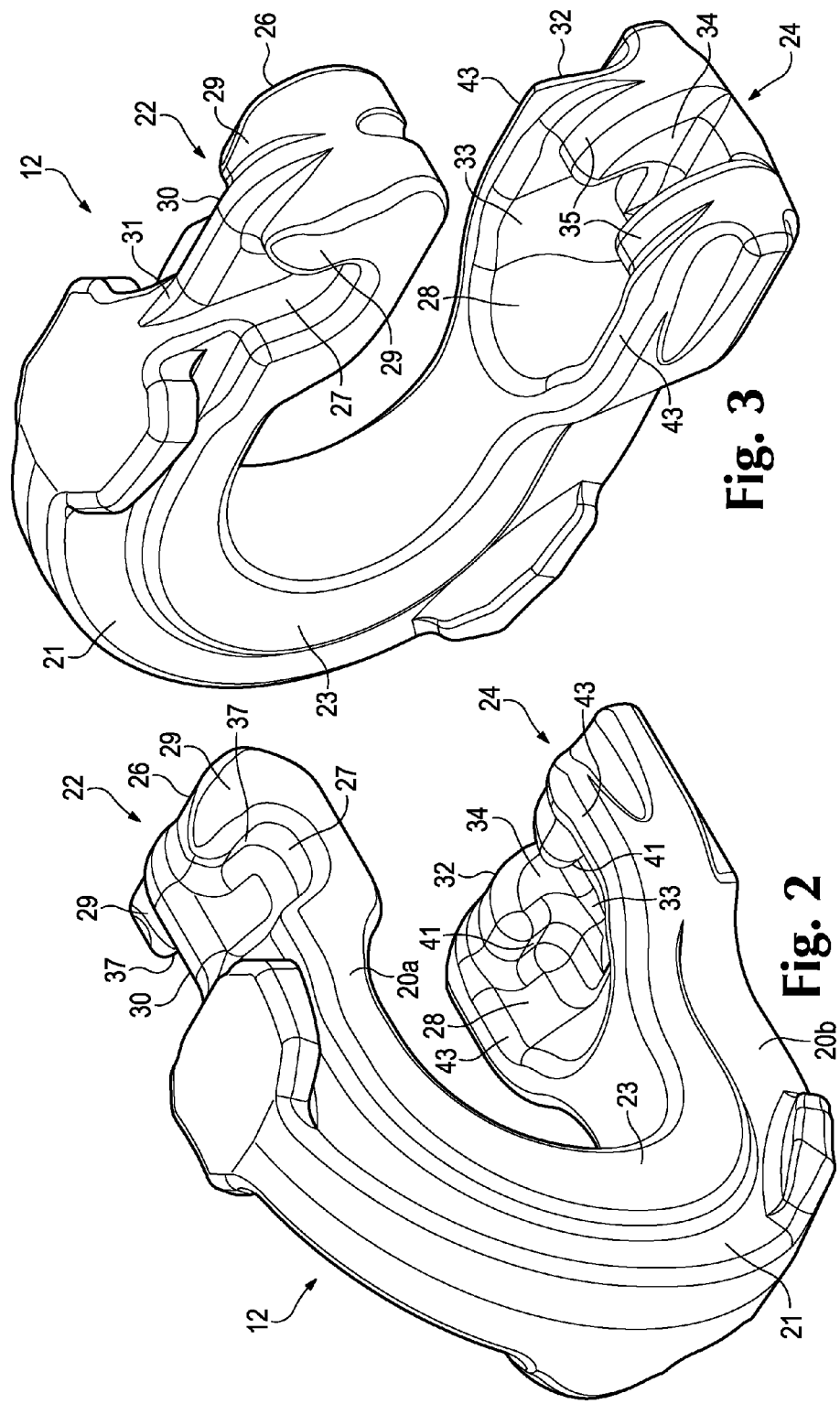

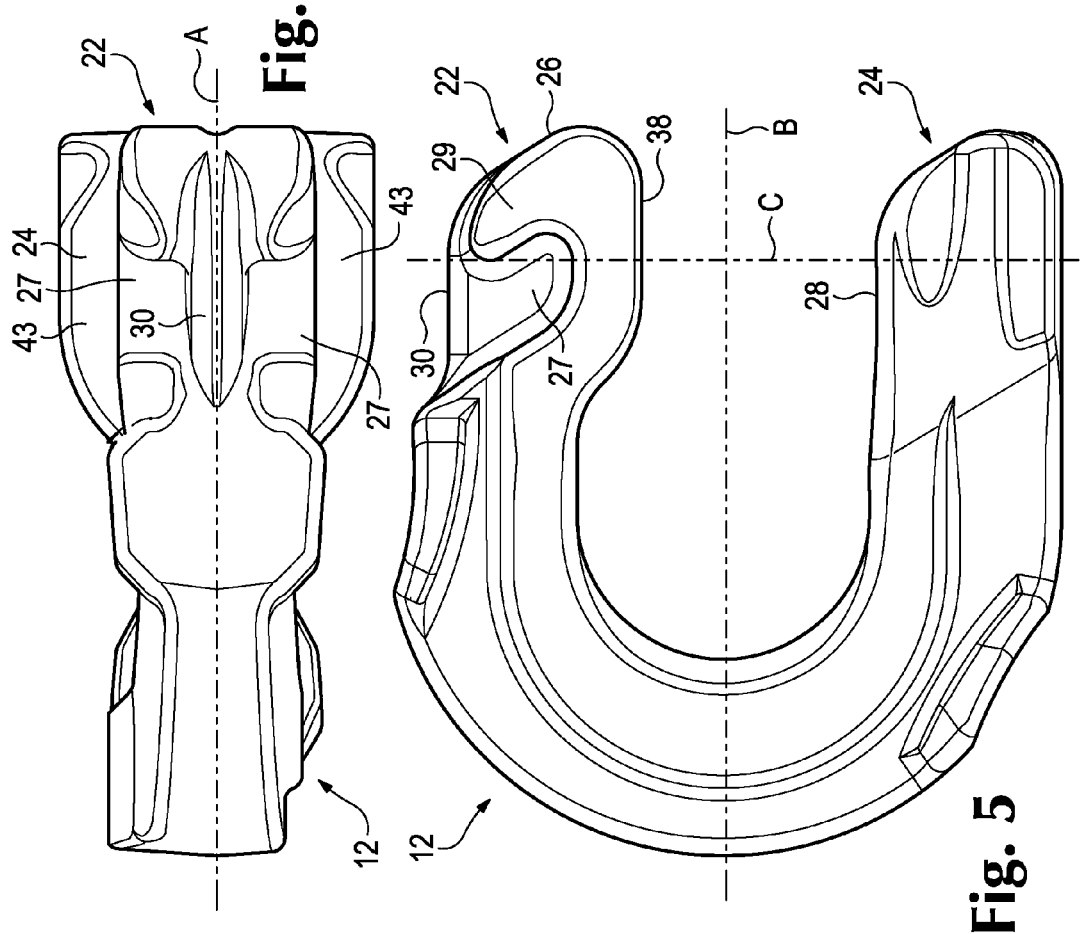

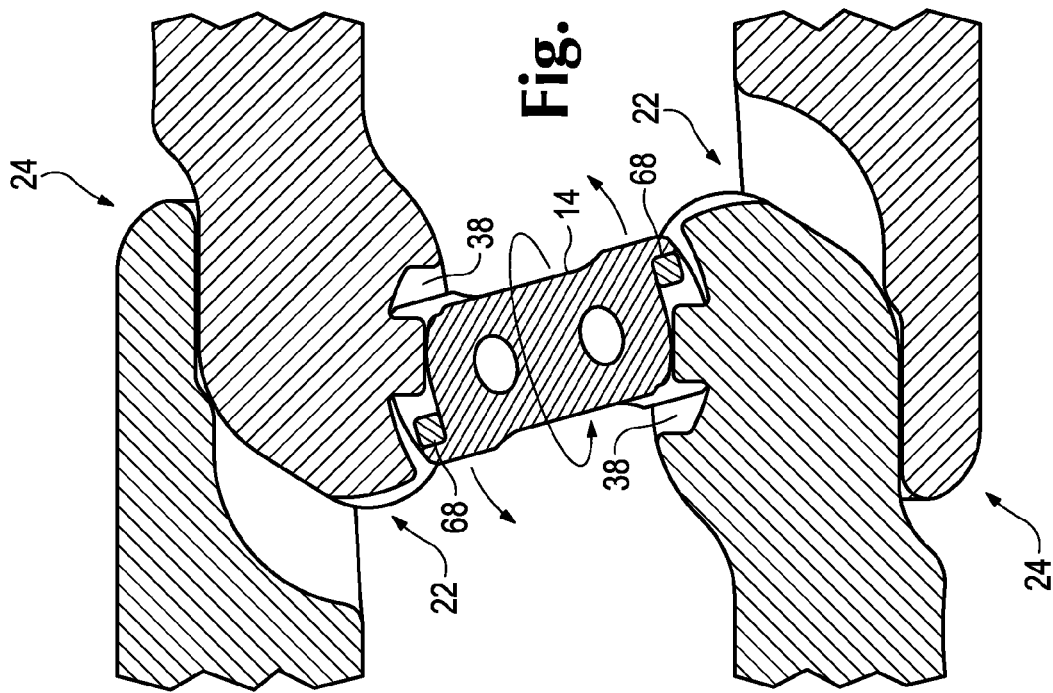
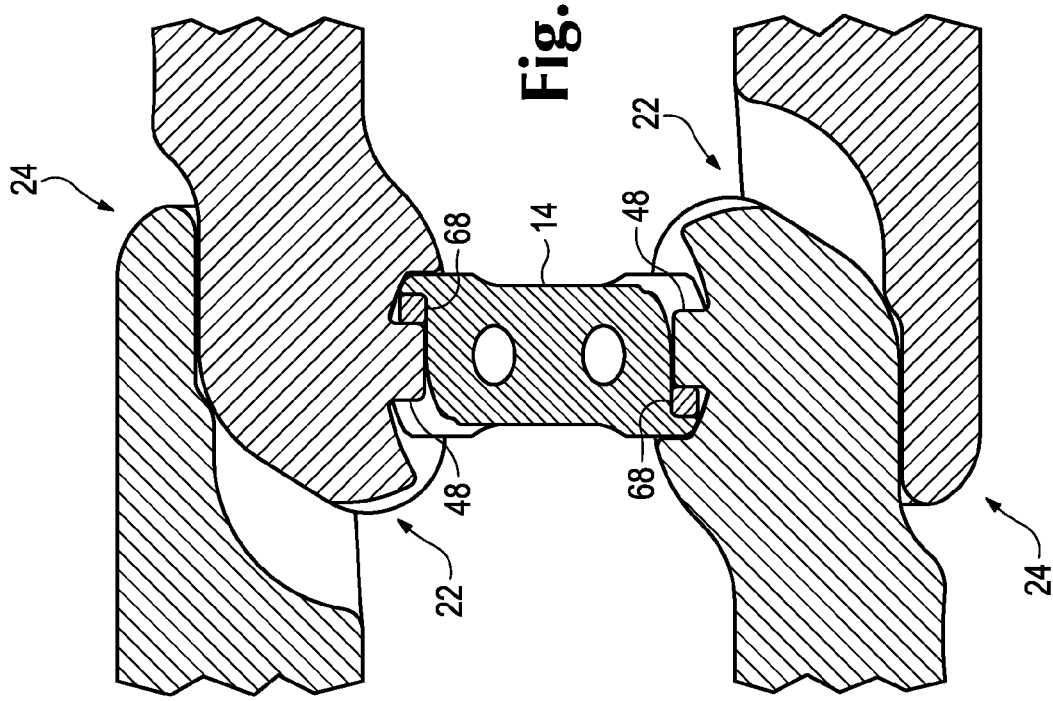

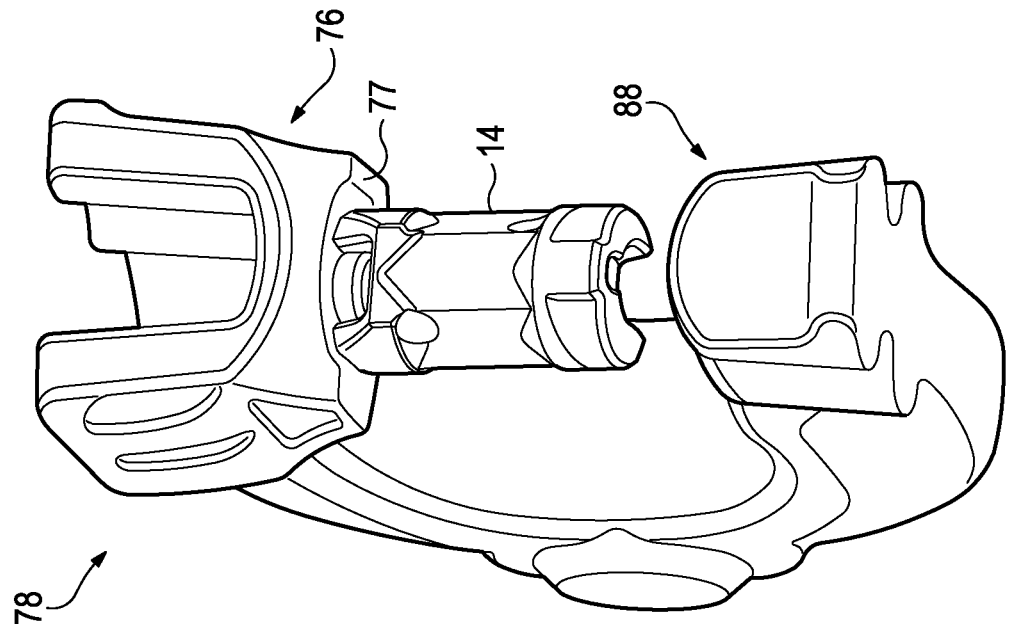
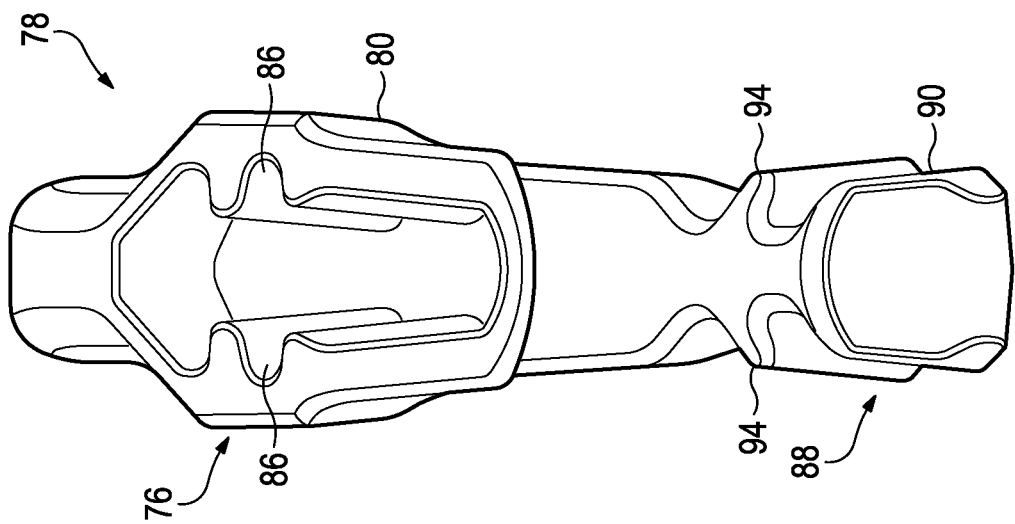
Fig. 19
Fig. 18

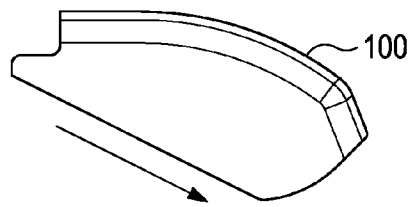
Fig. 26
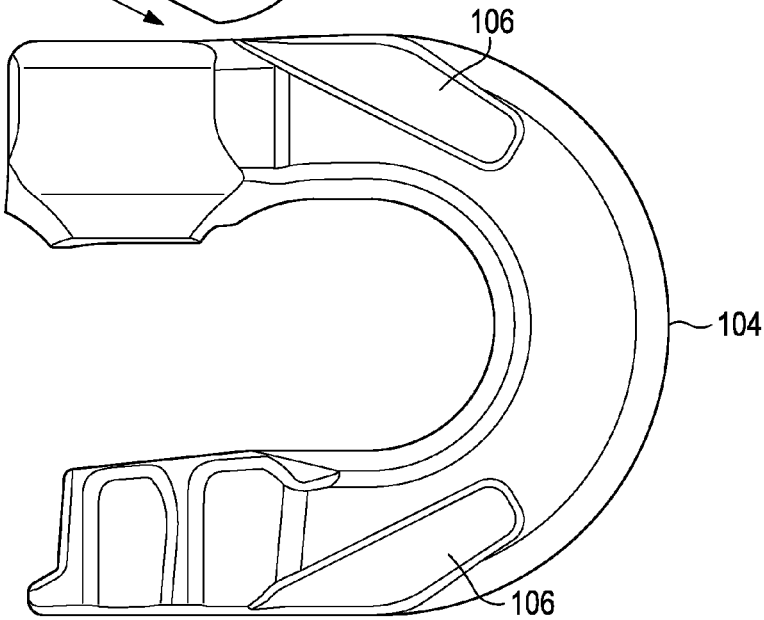
Fig. 27
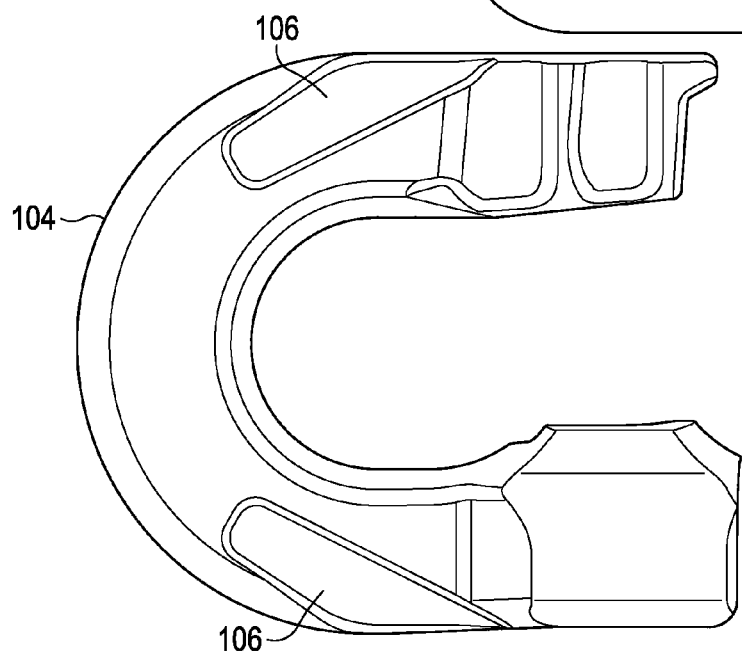

CHAIN AND COUPLING LINKS

FIELD OF THE DISCLOSURE

The present invention relates to chain and to coupling links for connecting two parts together that include link-compatible connectors. Such coupling links are, for example, used to connect or repair load-bearing chains.

BACKGROUND OF THE DISCLOSURE

Heavy chains are often used for lifting, dragging, or stabilizing extremely heavy loads. Such heavy load-bearing chains are used in dragline mining operations where the chain is used to hoist and drag the bucket, in marine applications where the chain is used in mooring or anchoring large sea vessels, and in other applications where the chain is exposed to high pull loads and/or external wear conditions. When a link in such a load-bearing chain fails or wears out, a coupling link (i.e., a link that can be assembled for installation and disassembled for removal) can be used as a temporary or permanent repair of the chain, i.e., to replace the broken or worn link. The installation and removal of coupling links, however, typically occurs in the field under less than ideal conditions.

In dragline operations, a large bucket is suspended from a boom by an arrangement of cables, hoist chains and rigging components, and is pulled through the ground, toward the dragline machine, by way of cables and drag chains. Chain for dragline operations is usually made by casting each link in-situ around an adjacent link. In this way, there are no joints or welds in any of the links so as to provide enhanced strength and durability. Coupling links are used with these chains to connect them to the dragline bucket and to replace worn or broken chain links.

The drag chain and hoist chain are put under considerable load and are subjected to adverse wear conditions. For example, hoist chains for large dragline buckets may be loaded up to as much as 1,000,000 pounds. Drag chains are not only put under very high loading, but are also subjected to high levels of abrasion and impacts as the drag chains are often pulled along and through the ground during a digging operation. The coupling links must be able to withstand the same loads and conditions. Unexpected breakage or premature wearing out of a chain link can result in economic loss with downtime for the excavating machine and, in some cases, a hazard to workers.

Coupling links are prone to suffering premature failures and short life spans. Moreover, in efforts to withstand the rigors of digging, coupling links have included various retainers to hold the components of the coupling link together. The retainers, however, are generally difficult to remove on account of earthen fines, distortion of the parts, corrosion, etc. They also typically require a hammer for both installation and removal, which can impose safety hazards to the workers.

SUMMARY OF THE DISCLOSURE

The present invention relates to a coupling link for connecting two parts together that include link compatible connectors, and to chain links with wear caps for extended usable chain life.

In one aspect of the present invention, a coupling link includes link components (which each form a partial link) that are joined together, and a removable support. The support and link components are coupled together by their own structure without a hammer, and without additional retainers to withstand high loads and/or adverse wear conditions. The inventive construction is strong, durable, efficient, safer, cost effective and easy to use.

In another aspect of the invention, a coupling link includes link components joined together and a support that is installed and secured via a successive rotations about generally perpendicular axes.

In another aspect of the invention, a coupling link includes link components each with complementary connectors to join the components, and a removable support to prevent disassembly of the joined components. The link components define opposing engagement stations each with an inwardly directed post about which the support is secured in place.

In another aspect of the invention, a coupling link includes link components each having a pair of complementary hook structures to join the components together. One hook structure includes a hooked connecting element with a bisecting rib, and the other hook structure includes a hooked connecting element with a medial slot for receiving the rib. The engaged hook structures are better able to resist failure, fatigue and wear.

In another aspect of the invention, a coupling link includes link components each having a pair of complementary hook structures to join the components together. Each hook structure includes at least one hooked connecting element to contact a complementary hooked connecting element, and at least one axial supporting element to strengthen the hooked connecting element for enhanced strength and durability.

In another aspect of the invention, a coupling link includes link components and a removable support that are mutually joined together and disassembled without a hammer to define a complete hammerless coupling link.

In another aspect of the invention, a removable internal support for a coupling link has opposite end formations each including a recess with a partially surrounding wall whereby the support engages opposed stations to prevent disassembly of the engaged link components.

In another aspect of the invention, one or more links of a chain are provided with mechanically secured removable wear caps for extended wear of the chain.

In another aspect of the invention, one or more links of a chain are formed with mounting formations upon which are secured removable wear caps for extended life of the chain.

In another aspect of the invention, wear caps for chain links are provided with a mounting channel for receiving a portion of a link, an external wear surface, and mounting formation for engaging the link.

BRIEF DESCRIPTION OF THE DRAWINGS

FIG. 1 is a perspective view of a coupling link according to an embodiment of the invention.

FIG. 2 is a left, rear perspective view of a link component according to the embodiment of FIG. 1.

FIG. 3 is a left, front perspective view of the link component of FIG. 2.

FIG. 4 is a plan view of the link component of FIG. 2.

FIG. 5 is a left side elevation of the link component of FIG. 2.

FIG. 6 is a front elevation of the link component of FIG. 2.

FIG. 15 is a sectional view along the symmetric mirror plane of the coupling link of FIG. 11.

FIG. 15A is the sectional view of FIG. 15 but showing the process of disengaging the link support of FIG. 8.

FIG. 18 is a front perspective view of the link component of FIG. 16.

FIG. 19 is a front perspective view of the link component of FIG. 16 with the link support of FIG. 8 engaged to the locking station on the inner surface of the first end of the link component.

FIG. 26 is a side elevation view of a link component and partial wear cap according to an exemplary embodiment of the invention.

FIG. 27 is a side elevation view of a link component and partial wear cap according to an exemplary embodiment of the invention, complementary to the link component and partial wear cap of FIG. 26.

DETAILED DESCRIPTION OF THE PREFERRED EMBODIMENTS

Figure 7:
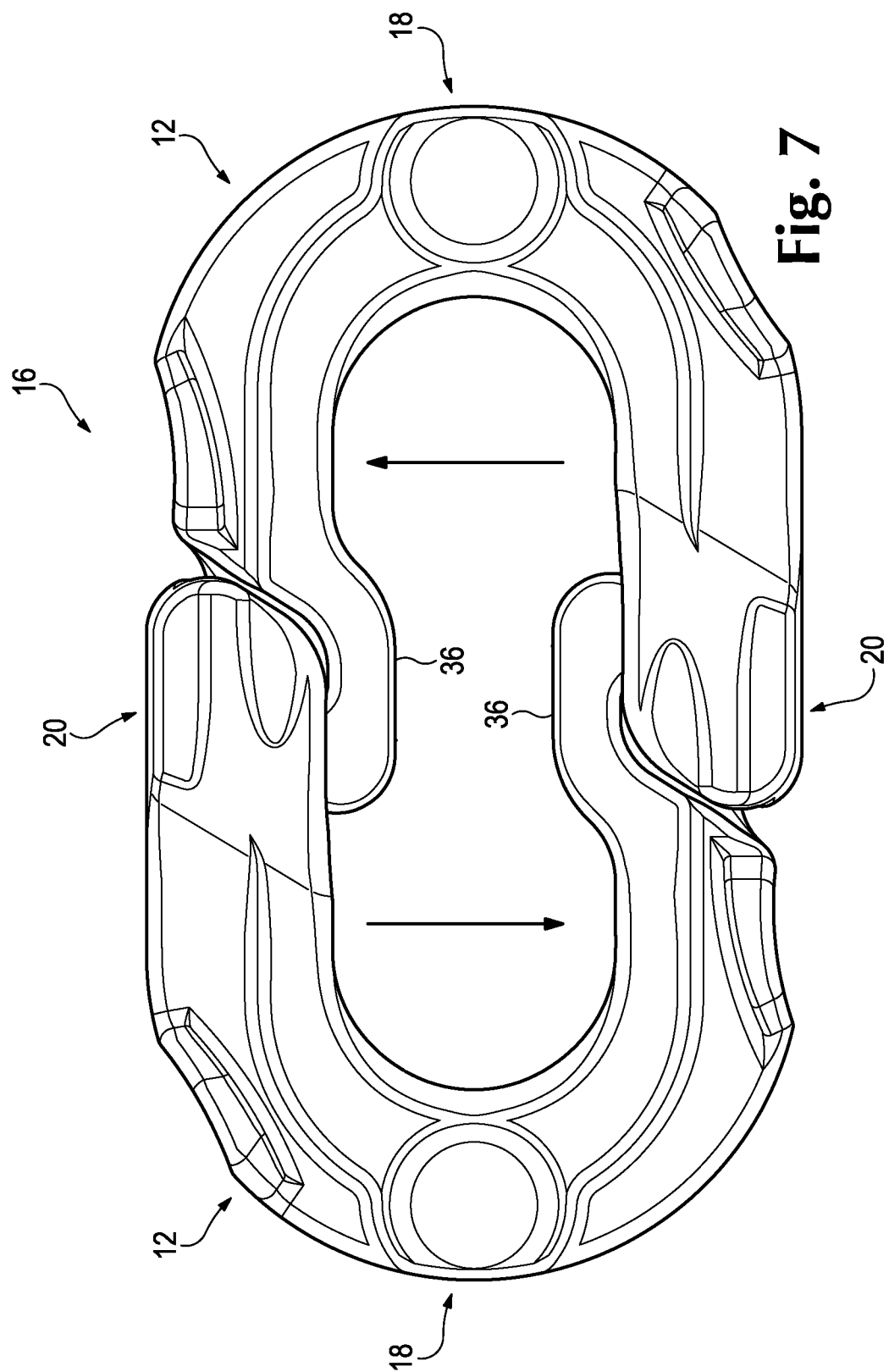
FIG. 7 is a side elevation of the joined link components of FIG. 2.

The present invention relates to a coupling link for connecting two parts together that include link compatible connectors. A link compatible connector includes a loop with an opening sized and shaped to receive and couple to a chain link. The coupling links of the present invention are particularly suited for connecting lengths of heavy, weight-bearing chain (such as used in dragline mining operations, marine applications, etc.) together or to another product, such as a dragline bucket, but could be used to secure two products (other than chain) together provided each has a link compatible connection which the coupling link can engage.

As one example of use, the inventive coupling link (such as coupling link 10) can be used as a field-replaceable chain link for dragline mining operations. In these environments, the coupling links are often referred to as repair links. Traditionally, chain for dragline operations is made by casting each link in-situ around an adjacent link. In this way, there are no joints or welds in any of the links so as to provide enhanced strength and durability. Coupling links, which can be assembled for installation and disassembled for removal, are used to connect the in-situ cast chain to, for example, the bucket or to replace worn or broken chain links.

As noted above, chains used to lift dragline buckets (i.e., hoist chains) and to drag dragline buckets (i.e., drag chains) are subjected to tremendous forces, with, e.g., the hoist chains carrying in some cases as much as 1,000,000 pounds. The environments for use are extremely abrasive, with chain links rubbing against each other, against equipment, and the ground. Accordingly, each link must be very strong, and must be particularly tough and functional even after losing substantial amounts of material. However, the cast chain needs some way to be attached to the bucket and rigging, and individual links do, at times need replacement. Accordingly, coupling links, which may be broken into separate components and assembled and disassembled around the existing links and link-compatible connectors, are used. The coupling links need to be able to withstand the same loads and abrasive environment as the cast chain.

Conventional chain links for dragline buckets may weigh in the range of 300 pounds per link to 600 pounds per link. Such links are typically used until approximately 40% of the original material is worn away. Often times, wearing of the chain links is consistent and localized, such that only one portion of each chain link is worn away over time. For example, it is common for one side of the relevant chain link (i.e., in drag chain) to be dragged along and repeatedly rubbed against the ground, while the remainder of that chain link is relatively free from abrasion. Accordingly, in such conditions, only one side of the chain links wear away at a time. Due to the localized nature of the abrasion, the chain may be flipped and/or rotated, typically 90° or 180° along its long axis, to wear other portions of the chain links for extending the use of the chain. Accordingly, the coupling links need to be able to accommodate use in different orientations.

In one embodiment of the present invention, coupling link 10 includes two link components 12, and a link support 14 (also referred to as a locking pin, strut or lock). Coupling link 10 defines a chain link 16 that can be used with other chain links including cast chain links. Each link component 12 is interlocked with the other to form a contiguous link formation 16 having opposite ends 18 and sides 20 interconnecting the ends. In this embodiment, ends 18 are each semi-circular and the sides are parallel; other constructions though could be used. In this one construction, each link component 12 has a stepped configuration defined by a central ridge portion 21 bordered on each side by wider but shallower margin portions 23 to match with chain associated with dragline operations. Of course, other shapes and structures could be used. The link 16 is secured against disassembly by the presence of a link support 14 that is secured between the parallel sides 18 of link 16, with an orientation that is orthogonal to the two parallel sides 20.

As shown in FIGS. 2 and 3, each link component 12 is preferably identical and formed to be generally U-shaped with a first end 22 at the free end of one leg 20a and a second end 24 at the free end of the other leg 20b. The first end 22 of the link component 12 is configured to interlock with the second end 24 of another link component 12. That is, two link components 12 may be reversibly interlocked by engaging the first end 22 of the first link component with the second end 24 of the second link component, at the same time that the second end 24 of the first link component engages the first end 22 of the second link component.

It should be appreciated that a wide variety of suitable conformations of the first and second ends of the link components disclosed herein may exist, and some conformations may have particular advantages for selected applications. The following selected embodiments are innovative and beneficial but the invention is not limited to a particular construction for connecting the two link components. On the contrary, any physical configuration of the first and second ends that reversibly and securely interlock two link components to form a link and will retain an in-plane motion for disassembly is suitable for the purposes of this disclosure. While the use of identical link components which are "half-links" is preferred for ease of manufacturing, storage and use, it is not essential that the link components be identical or even actually "half" the link. One portion of the link could be formed larger than the other portion of the link. Additionally, the ends of one link component could have the same connectors while the ends of the other link component could have the complementary end connectors.

As shown for the embodiment of FIGS. 2-6, the first end 22 of link component 12 includes an outward-facing hook or hook structure 26, where outward-facing refers to features that are oriented away from the interior of the link component, or the interior of the link, respectively. Likewise, the outer surface of the link component 12 is the surface opposite the surface facing the interior of the link component or the interior of the link. The second end 24 of the link component includes an inward-facing hook or hook structure 28 that is configured to engage the outward-facing hook structure 26. More specifically, hook 28 has a conformation that is configured to engage with and interlock securely to the hook 26 of the first end 22. The hook structures could be reversed so that hook 26 is inward facing and hook 28 is outward facing. Other kinds of connectors besides hook structures could be used.

Figure 32:
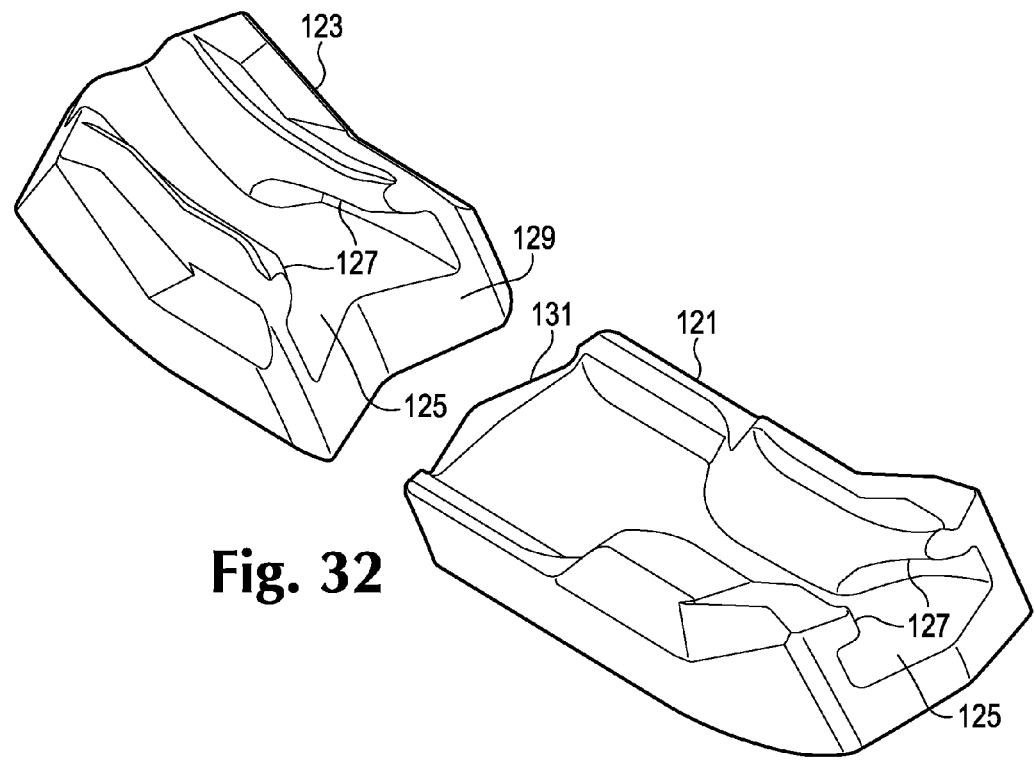
FIG. 32 is a perspective view of an alternative wear cap construction for use on the link shown in FIG. 1.

Hook structure 26 preferably includes recesses 27 and upturned fingers 29 to engage and hold hook 28. A median reinforcing rib 30 bisects recesses 27 and fingers 29, i.e., the space defined by the curve of hook structure 26. As shown more clearly in FIG. 4, rib 30 lies preferably along a mirror plane of symmetry A that lies within the plane of the link component. Rib 30 provides additional strength to the hook structure 26 to better resist straightening or splitting of fingers 29, which, in turn, results in a strengthened coupling link 10 to better withstand the rigors of, e.g., digging in a dragline operation. Rib 30 preferably has a reduced height compared to the ridge portion 21 for receipt with hook 28, and curves into ridge via a smooth transition portion 31. This enables the outer surfaces of the link components to collectively define a generally smooth surface. Mounting surfaces 63 are provided for attaching wear caps 121, 123 (FIG. 32), such as discussed below, and could be omitted if no wear caps are used.

Hook structure 28 includes a pocket or recess 33 and upturned fingers 35. Pocket 33 is formed with a width, depth and length to receive fingers 29 and rib 31 of hook 26 such that the inner bearing surfaces 37 of fingers 29 bear against the inner bearing surfaces 41 of fingers 35. Pocket 33 is defined by a pair of sidewalls 43, which extend alongside hook 26 when the hooks are engaged to better hold the fingers 29, 35 in engagement during use. Sidewalls 43 provide additional strength to fingers 35, like rib 30, to better resist straightening or splitting of fingers 35 during use. An opening 34, preferably in the form of a slot or groove, extends through and divides fingers 35 to receive the extension of rib 30. The use of such interlocking hooks 26, 28 is shielded by the broad outer surface 45 of hook 28 (FIG. 1).

Accordingly, hook structure 28 is a female connector and hook structure 26 is a mating male structure. Hooks 26, 28 are engaged and disengaged generally by moving the link components 12 in a direction transverse to the extension of sides 20 and in the plane of the coupling link 10 (see the arrows in FIG. 7). Although the arrows in FIG. 7 show the link components separating from each other in a straight line motion, the hooks 26, 28 in this embodiment overlap each other in this direction such that the parts must first shift apart perpendicular to the illustrated arrows (FIG. 7) before being separated in the direction of the shown arrows. The first end 22 and second end 24 may incorporate alternative structures and/or additional features so long as they couple together to hold the link components together during use and release in the same general direction.

As shown in FIG. 7, by interlocking two link components 12, a link 16 is formed. Upon formation of the link, the inner surfaces 36 of each first end 22 become an inner link surface of a side 20 of the link 16. In order to secure the link, the link support 14 is secured within the link, between and orthogonal to the sides 20. In order to secure the link support, each inner link surface 36 includes a locking station 38 that is configured to receive and secure an end of a link support 14.

Figure 8:
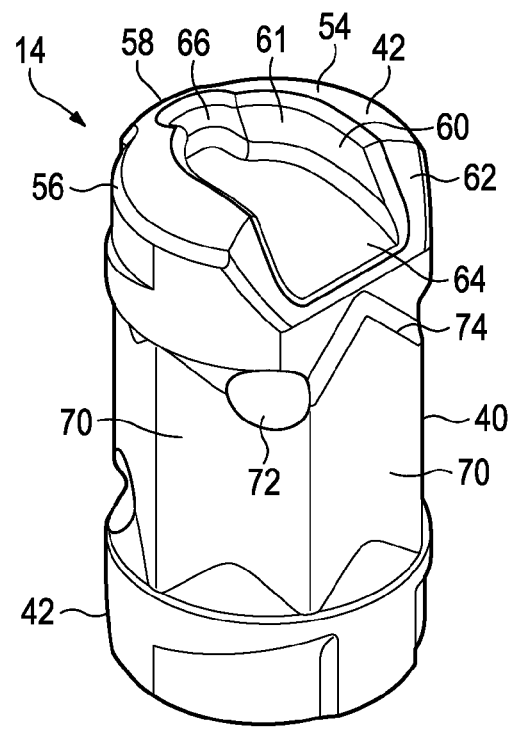
FIG. 8 is a perspective view of a link support according to an embodiment of the invention.
Figure 9:
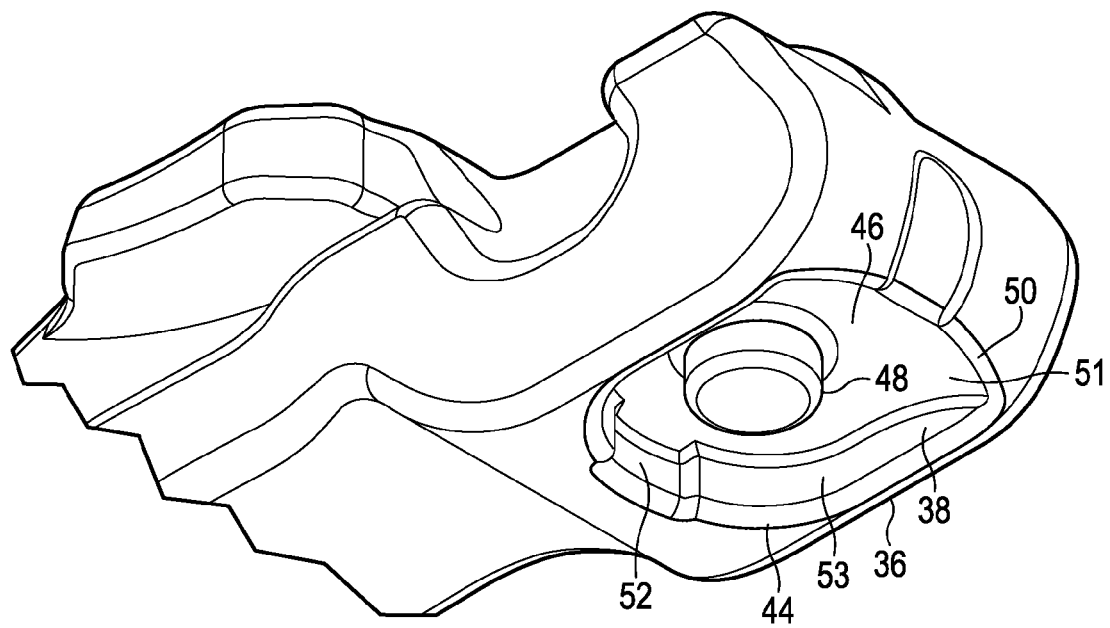
FIG. 9 is a partial perspective view of the inner surface of a first end of the link component of FIG. 2, showing a locking station configured to receive the link support.

Link support (or locking pin) 14 of the present invention is shown in FIG. 8. A complementary locking station 38 on the inner surface 36 of hook 26 is shown in FIG. 9. Link support 14 interlocks with opposing locking stations 38 on the interlocked link components 12 to secure the link components together and provide adequate support to sides 20, i.e., to prevent inward bending of the legs caused by tension in the chain during use. In the present invention, link support 14 provides both functions of securing the components together into a working chain link and resisting inward bending of the legs of the chain link.

Link support 14 includes a base 40 with opposite end formations 42. In the illustrated embodiment, the ends of link support 14 are capped at each end by an end cap defining the end formation 42. The term "end formation" is used to designate the formation that engages the locking stations on the link components, and could be formed by a separate component attached to the ends of the base or formed as the ends of the base. The end formations of the link support of the present disclosure are preferably identical to facilitate installation and locking of the link support in either orientation. Link support 14 is preferably formed as a single piece of metal with two elastomeric inserts, but could be formed from multiple metal or composite parts. Although this form of link support 14 is elongate with a central shaft 40, link support 14 could have a wide variety of constructions including non-elongate shapes.

In the illustrated embodiment, link support 14 is symmetric with respect to a 180 degree rotation around the longitudinal axis, followed by a reflection through a plane orthogonal to the longitudinal axis at the midpoint of the link support. In other words, the end formations 42 are identical but oriented 180 degrees relative to each other about the longitudinal axis of the link support. The end formations could be different so long as they engage a respective locking station. Moreover, the end formations could face the same direction if the link support were installed in a translation motion instead of rotating about a transverse axis (as discussed below).

Each end formation 42 is configured in the illustrated embodiment to reversibly engage the corresponding locking station 38 in link component 12. As shown in FIG. 9, locking station 38, in this embodiment, includes a recess 51 defined by a peripheral wall 44 that forms the side surfaces 53 of the recess, and an inner surface 46 that defines a shallow concave dome. Inner surface 46 preferably conforms to a spherical segment though other shapes are possible. At the center of the recess 51, and at the deepest portion of the shallow concave dome, a central post 48 extends from inner surface 46. Recess 51 is bound by peripheral wall 44 on three sides, but has no side wall along the distal edge 50 of the recess to define an inlet facilitating insertion of the end formation 42 of the link support 14 (FIG. 9). The inlet 50 appears reduced in FIGS. 14 and 14a because of the curvature of surface 46. Opposite the open distal edge, at the midpoint of the proximal side wall, the side wall includes an indentation 52.

Each end formation 42 of link support 14 includes an end surface 54. End surface 54 partially defines a shallow convex dome having an appropriate size and curvature to match or compliment the shallow concave dome of the inner surface 46 of the recess 51. The end formation 42 is also defined by a semi-circular side wall 56 having a size and curvature to match the closed end of peripheral wall 44 of recess 51. If the link support 14 were to be installed by an initial transation instead of an initial rotation about a transverse axis (as discussed below), a number of the curved surfaces of the link support and locking station could be planar. The side wall 56 further includes a protrusion, or tab 58, that is sized and localized to match indentation 52 of peripheral wall 44. The size and shape of the tab 58 and indentation 52 could be different. For example, larger and/or more robust tab and indentation could be used in heavy duty environments. Additionally, other kinds of locking arrangements could be used in lieu of or in addition to tabs 58 and indentations 52.

The end surface 54 of the end formation 42 includes an opening or cavity 60 adapted to receive central post 48. The interior surface 61 of side wall 56 has a curvature and depth to match the curvature and height of central post 48. Side wall 56 further includes an angled cut-out or inlet 62 on the side opposite tab 58, in order to facilitate insertion of the link support 14 into recess 51 with simultaneous entry of central post 48 to the cavity 60. The floor 64 of cavity 60 slopes curvingly away from the end surface 54 of the end formation in the direction of the cut-out or inlet 62 in the side wall 56. Within cavity 60, along the inner surface of the side wall and at its midpoint, the side wall 56 includes an inset 66, where inset 66 typically includes a resilient block 68.

As each end formation 42 is structurally equivalent, and each locking station 38 of the link component 12 is structurally equivalent, link support 14 may be reversibly secured within and to the link 16 by placing the link support within the central opening of the link 16, and rotating the link support around a transverse axis to engage each end formation 42 with a corresponding locking station 38. By transverse axis is meant an axis that is orthogonal to both the longitudinal axis of the link support and the mirror plane of the link. The link support is rotated along the transverse axis until each end formation 42 enters a corresponding recess 51 in the link. Sufficient clearance between the link support and the link component is created by an alignment of the open distal edge 50 of the recess 38 with the cut-out portion 62 of the side wall 56 of the end formation. As the link support 14 is seated in both recesses 51, the central post 48 of each locking station 38 enters the opening 60 of the corresponding end formation 42, so that the end surface 54 of the end formation 42 makes contact with the inner surface 46 of recess 51. At this point, the link support 14 is in the release condition to accommodate installation and removal of the link support from link 16 (FIG. 14A). While the post is preferably confined in opening 60 in all directions except inlet, it could only be confined in a direction opposite the inlet to prevent removal of the link support. In such cases, movement of the link support could be prevented by other interlocking formations, such as peripheral wall 44.

Figure 14:
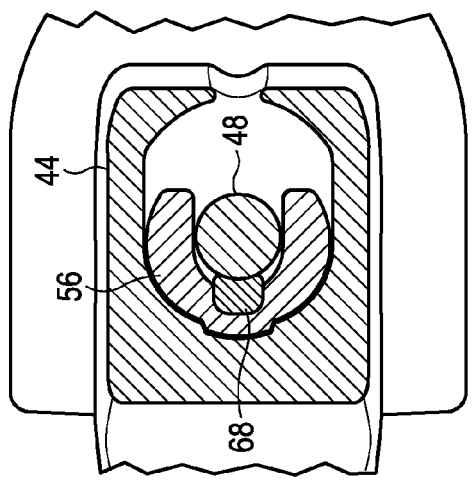
FIG. 14 is a sectional view along 14-14 of the coupling link of FIG. 11, after rotation of the link support to its in-use position.
Figure 14A:
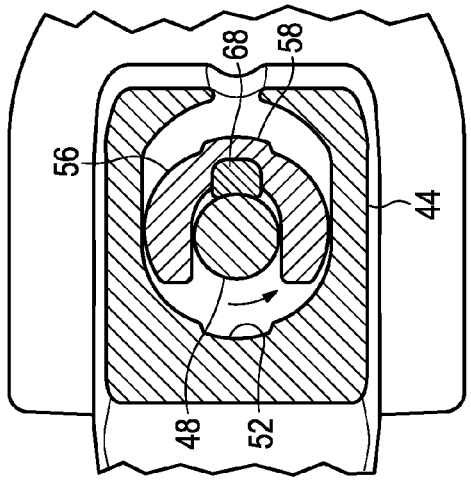
FIG. 14A is a sectional view along 14-14 of the coupling link of FIG. 11, before rotation of the link support to its in-use position.

Once each end formation is seated in a corresponding recess 51, the link support 14 is rotated by approximately 180 degrees around the longitudinal axis of the link support to the secured condition (FIG. 14). This rotation results in tab 58 of the end formation side wall to become seated within indentation 52 of the peripheral wall of the recess. The engagement between tab 58 and indentation 52 is enhanced by the presence of resilient block 68, which is simultaneously compressed between central post 48 and the side wall 61 of the opening 60 of the end formation 42, and therefore serves to urge the tab firmly into the indentation.

Other kinds of locking arrangements could be used to secure link support 14 in the link 16 defined by link components 12. As examples only, the link support could be inserted into the locking stations 38 from different directions, the various detents holding the link support in place could be replaced with spring-biased steel members, the posts could be lengthened, and/or the elastomer could be replaced with firmer steel components. Other, more significant changes could be made as well. As examples only, the locking stations and end formations could have substantially different configurations that engage and interlock by relative motion of the link support and parts of the components with or without additional retainers separately inserted after installation of the link support. While the use of link support 14 without additional retainers is preferred, certain aspects of the invention can still be enjoyed even with the insertion of one or more retainers inserted after installation of the link support.

Figure 10:
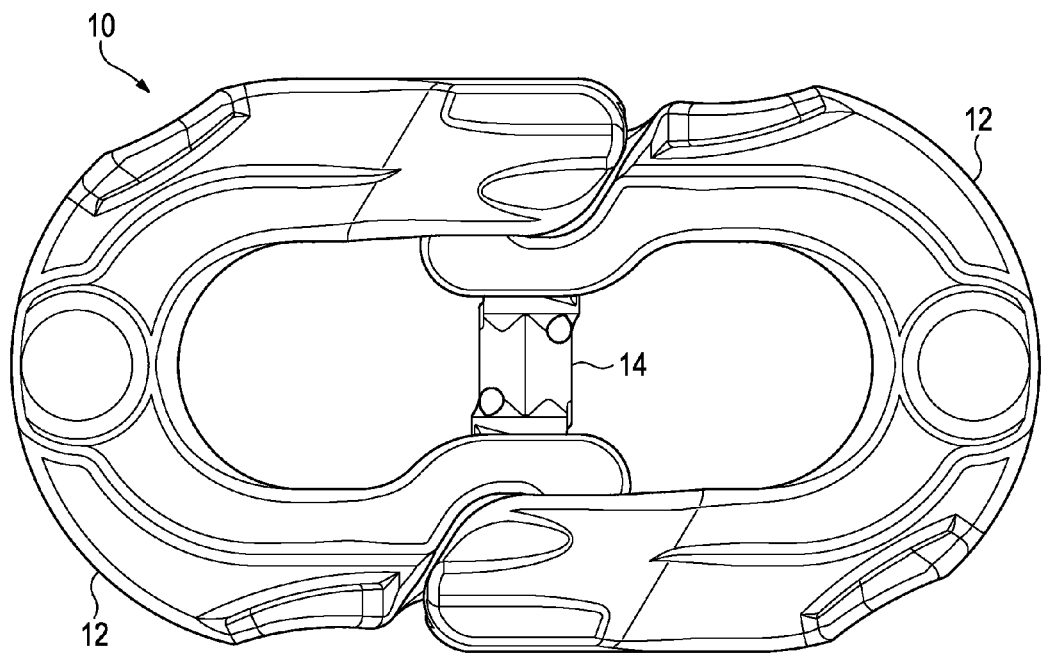
FIGS. 10-10c is a sequence of imagines showing a process of interlocking two link components of FIG. 2, followed by securing the interlocked link by engaging the link support of FIG. 8
Figure 10A:
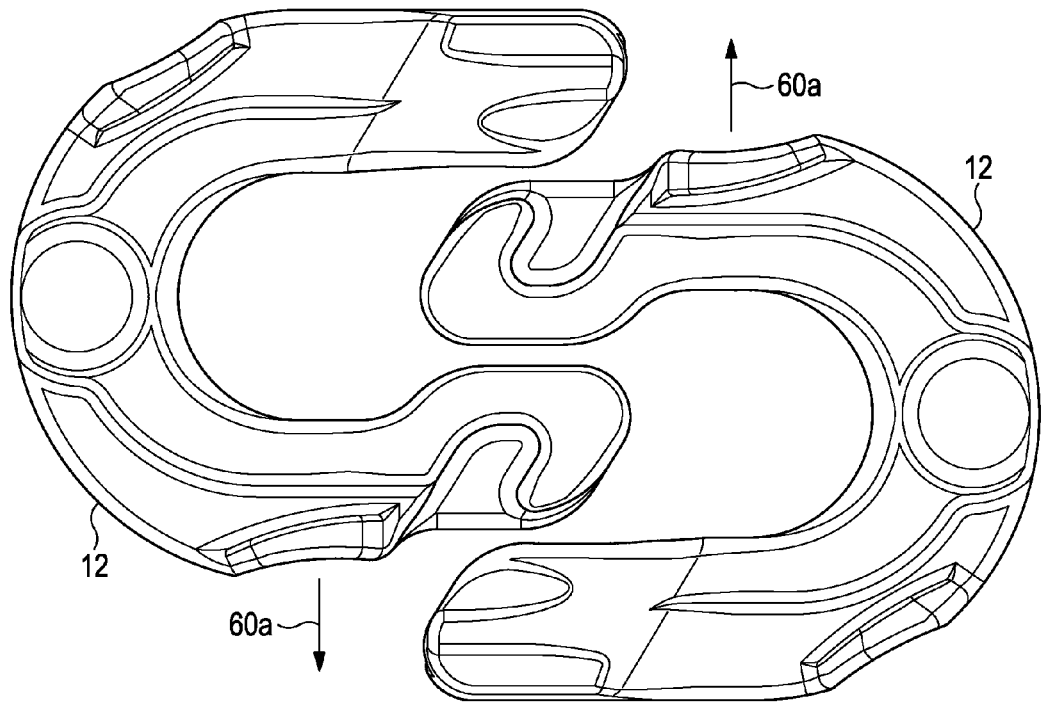
Figure 10B:
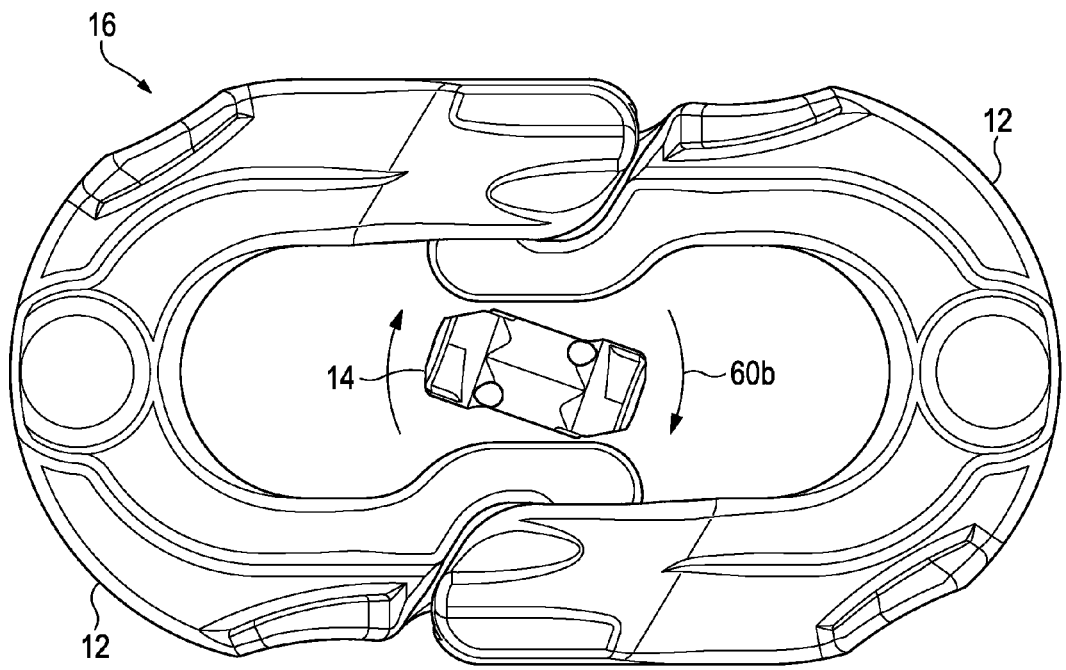
Figure 10C:
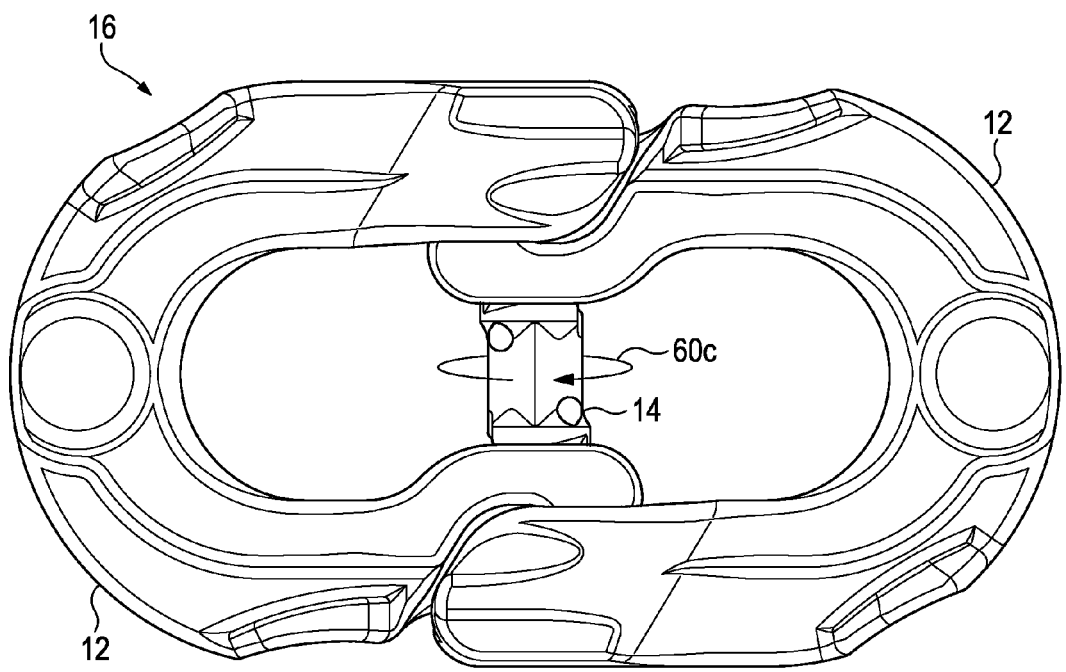

The overall process of engaging link support 14 within link 16 is shown in a series of steps in FIGS. 10a-10c to the final assembled product shown in FIG. 10. The assembly process begins with the interlocking of two link components 12 to form the link 16. As seen in FIG. 10a, one link component 12b is inverted relative to the other link component 12a (see arrows 60a). The two link components 12 are moved generally in the plane of the link 10 so that the hooks 26 engage the opposing hooks 28 on the opposite link component 12. After hooks 26, 28 are engaged, the link support 14 is placed between sides 20 in an orientation generally parallel to sides 20 (FIG. 10b). The link support 14 is, then, rotated about a transverse axis (see arrows 60b in FIG. 10b) so that each end formation 42 is brought into engagement with one of the locking stations 38. Once engaged, the end formations 42 are received into recesses 51 where they are engaged and supported by peripheral walls 44. With the end formations 42 in the respective recesses 51, link support 14 is rotated about its own longitudinal axis (i.e., the axis that extends centrally through the end formations 42) to secure the link support in place (see arrow 60c in FIG. 10c); i.e., rotation of link support 14 about its own axis causes end formations 42 to turn 180 degrees about the respective post 48. With this rotation of link support 14, inner wall 60 contacts post 48 to prevent reverse rotation of link support about the transverse axis (FIG. 14); i.e., the contact between pin 48 and inner wall 61 of end formation 42 prevents the link support from exiting through opening 50 in locking station 38. The engagement of tab 58 in indentation 52 (bolstered by resilient block 68) resists unwanted turning of link support 14 during use, i.e., in its final installed position (FIG. 10). While the use of a tab 58 and indentation 52 are preferably provided on each end formation 42 and locking station 52, they could be provided on only one of each (in such a case, the link support would not be reversible) or on both of one and only one of the other. The tab and indentation could also be reversed, with the tab on the locking station and the indentation on the link support.

Figure 11:
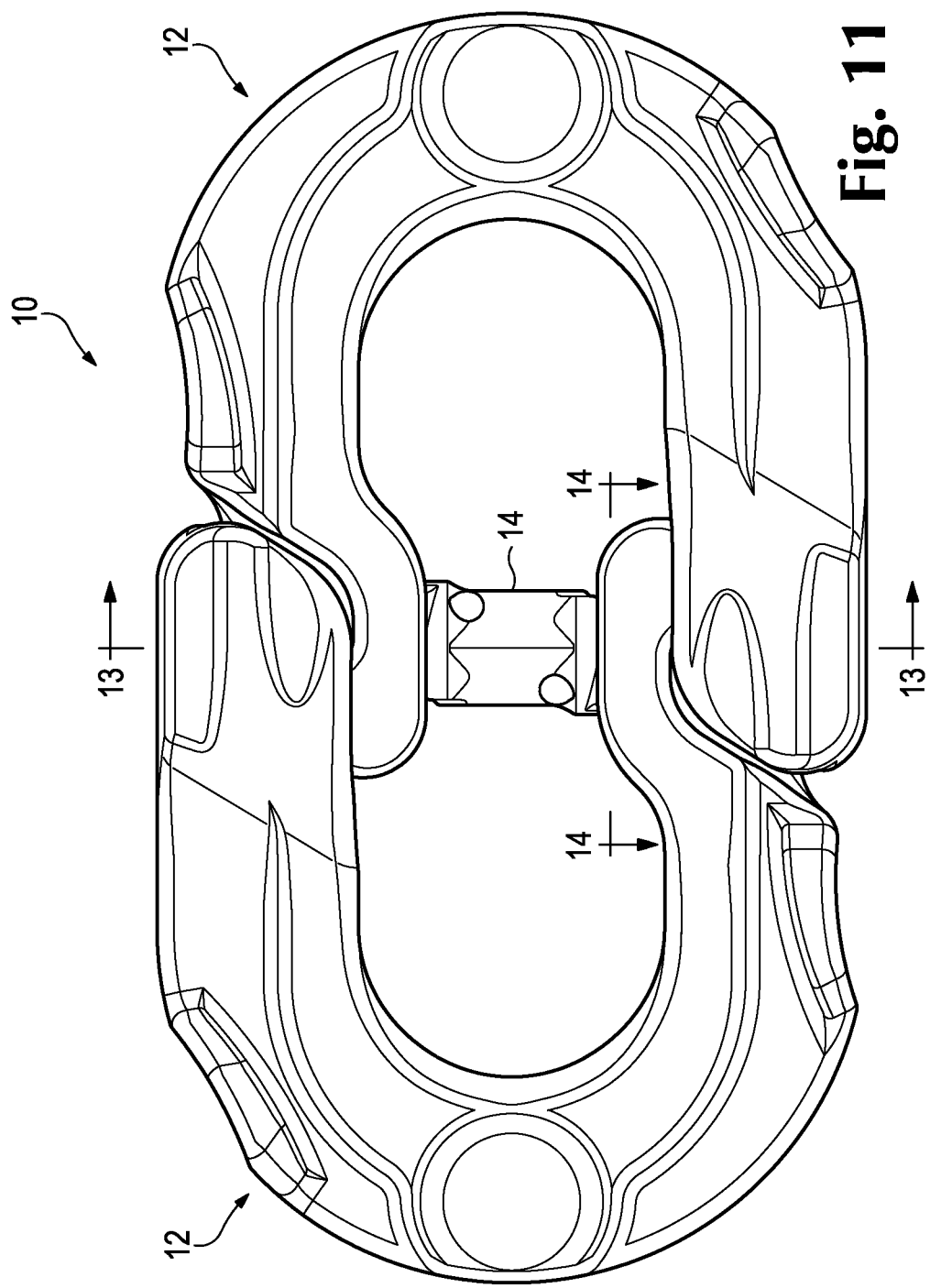
FIG. 11 is a side elevation of a coupling link according to an embodiment of the invention, assembled from two link components as shown in FIG. 2 and the link support of FIG. 8.
Figure 12:
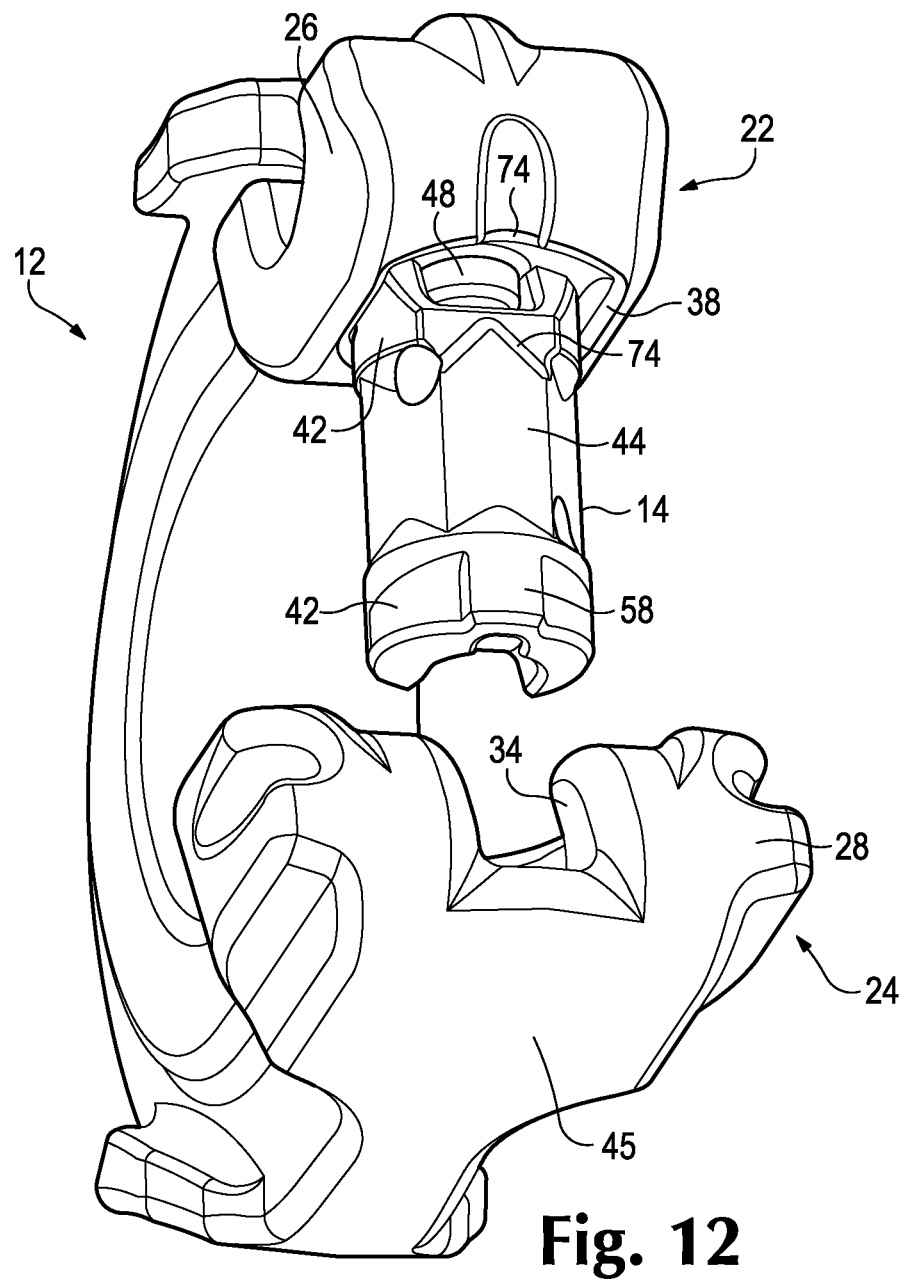
FIG. 12 is a front perspective view of the link component of FIG. 2 with the link support of FIG. 8 engaged to the locking station on the inner surface of the first end of the link component.

A side elevation of the resulting coupling link is provided in FIG. 11, showing the degree of interlocking between each link component with the other, as well as the close interaction between the link components and the link support. For comparison, FIG. 12 shows the engagement of a link support with a single link component. The link support end formation 42 has been engaged in recess 51, and rotated.

Figure 13:
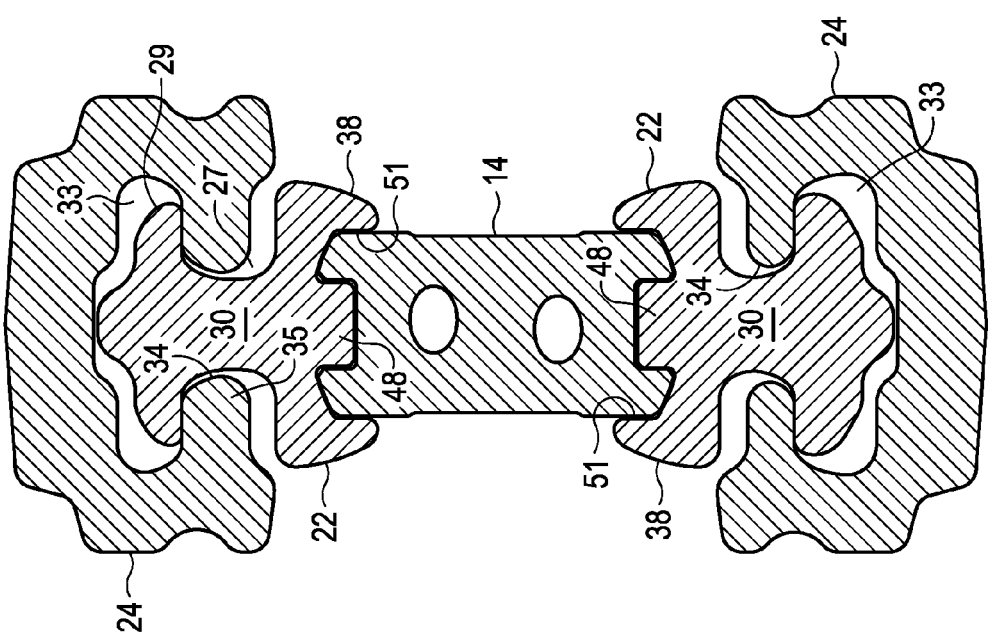
FIG. 13 is a sectional view along 13-13 of the coupling link of FIG. 11.

The sectional view of FIG. 13 shows the close engagement between link support 14 and each link component 12, as well as the interlocked nature of the two link components to form the chain link. The section views of FIGS. 14 and 14A show the rotation of the link support 14 from an unlocked position (FIG. 14a) to a locked position (FIG. 14), and highlight the interaction between tab 58, indentation 52, and post 48. As discussed above, when rotated into locked position, tab 58 seats within indentation 52, while resilient block 68 is compressed against central post 48, and therefore urges tab 58 firmly into the indentation.

The link support may be readily removed by reversing the sequence of operations used to secure it. As shown in the partial view of FIGS. 15 and 15a, link support 14 can be disengaged and removed from the coupling link by rotating the link support 14 by about 180 degrees around its longitudinal axis, followed by a rotation of the link support 14 around a transverse axis until the central post 48 of each recess 51 exits the upper cavity 60 of each end formation 42.

The coupling link of the present disclosure offers the advantageous property of being readily installed or removed without specialized equipment. Any tool that may help perform the necessary rotations of the link support to secure the coupling link is an appropriate tool for the purposes of this disclosure. Additionally, the link support 14 may incorporate one or more features intended to facilitate securing and/or removing the link support. For example, the central shaft 40 of the link support may exhibit planar and parallel side surfaces 70, so that a wrench or other tool may be used to rotate the link support. In particular, the central shaft may be defined by six regular flat planes, such that a cross-section of the central shaft is hexagonal in shape. Alternatively, or in addition, the central shaft may include one or more apertures 72, typically extending throughout the central shaft from side-to-side, to permit a rod, pry-bar or other tool to be inserted into the aperture and used to rotate the link support. Such apertures typically extend all the way through the central shaft at an angle that is orthogonal to the longitudinal axis of the link support.

In addition, the link components and link supports disclosed herein may include one or more visual indicia that inform a user when the link support is in a proper orientation for securing the coupling link. For example, as shown in FIGS. 8 and 9, the link support and the link component may each include a visual indicator 74, in this case a chevron, or arrow. The visual indicia are placed so that when link support 14 is rotated until the visual indicia are aligned, at which point the link support is in a locked position, as shown in FIG. 12.

Figure 17:
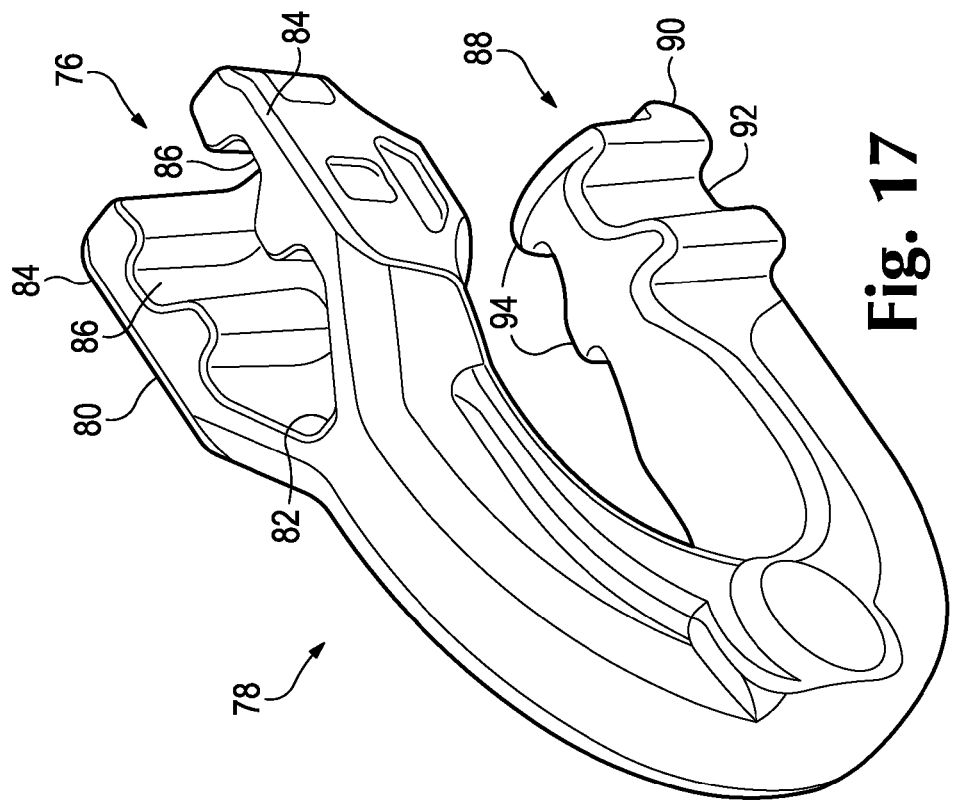
FIG. 17 is a left, rear perspective view of the link component of FIG. 16.
Figure 16:
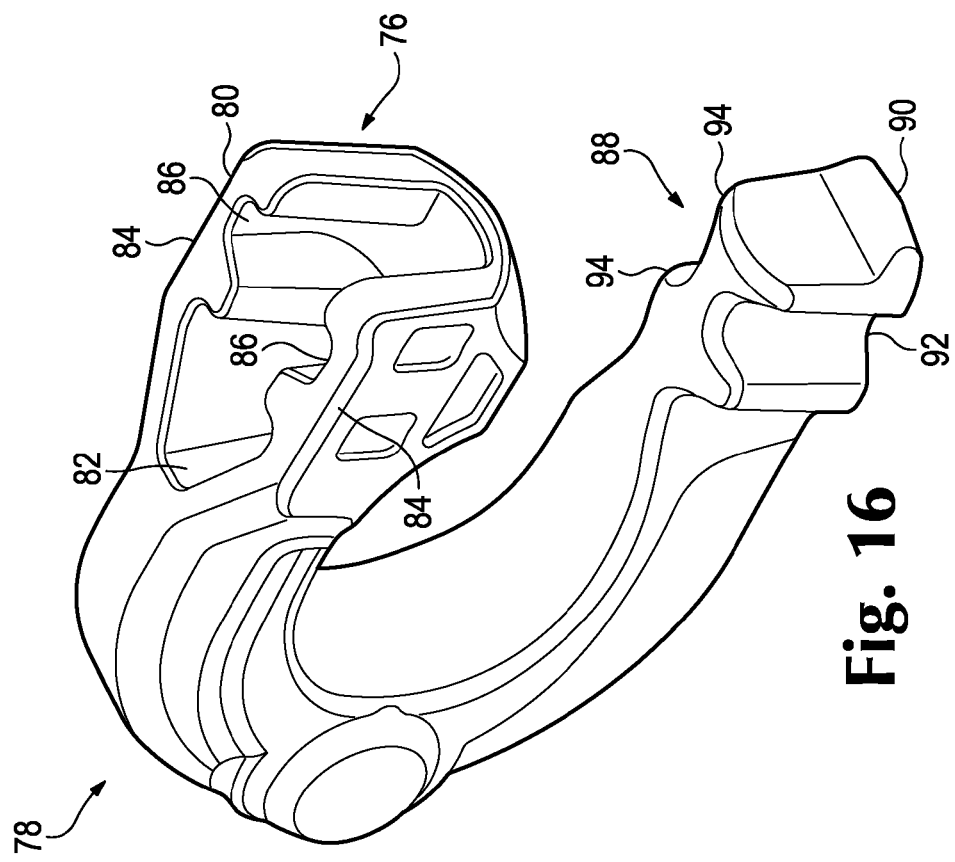
FIG. 16 is a left, front perspective view of a link component according to another embodiment of the invention.

An alternative embodiment of the link components of the present disclosure is provided in FIGS. 16-18. In this embodiment, the first end 76 of link component 78 includes an outward-facing scoop structure 80, the scoop structure having an inner wall 82 and two side walls 84, where the side walls include plural transverse channels 86. The second end 88 of link component 78 includes a plug 90, where the side walls 92 of the plug include plural transverse ridges 94 adapted to interlock with the transverse channels 86 of scoop structure 80. That is, each plug is configured to be inserted into and engage with each scoop. The directions of the scoops may be reversed in other embodiments.

Figure 20:
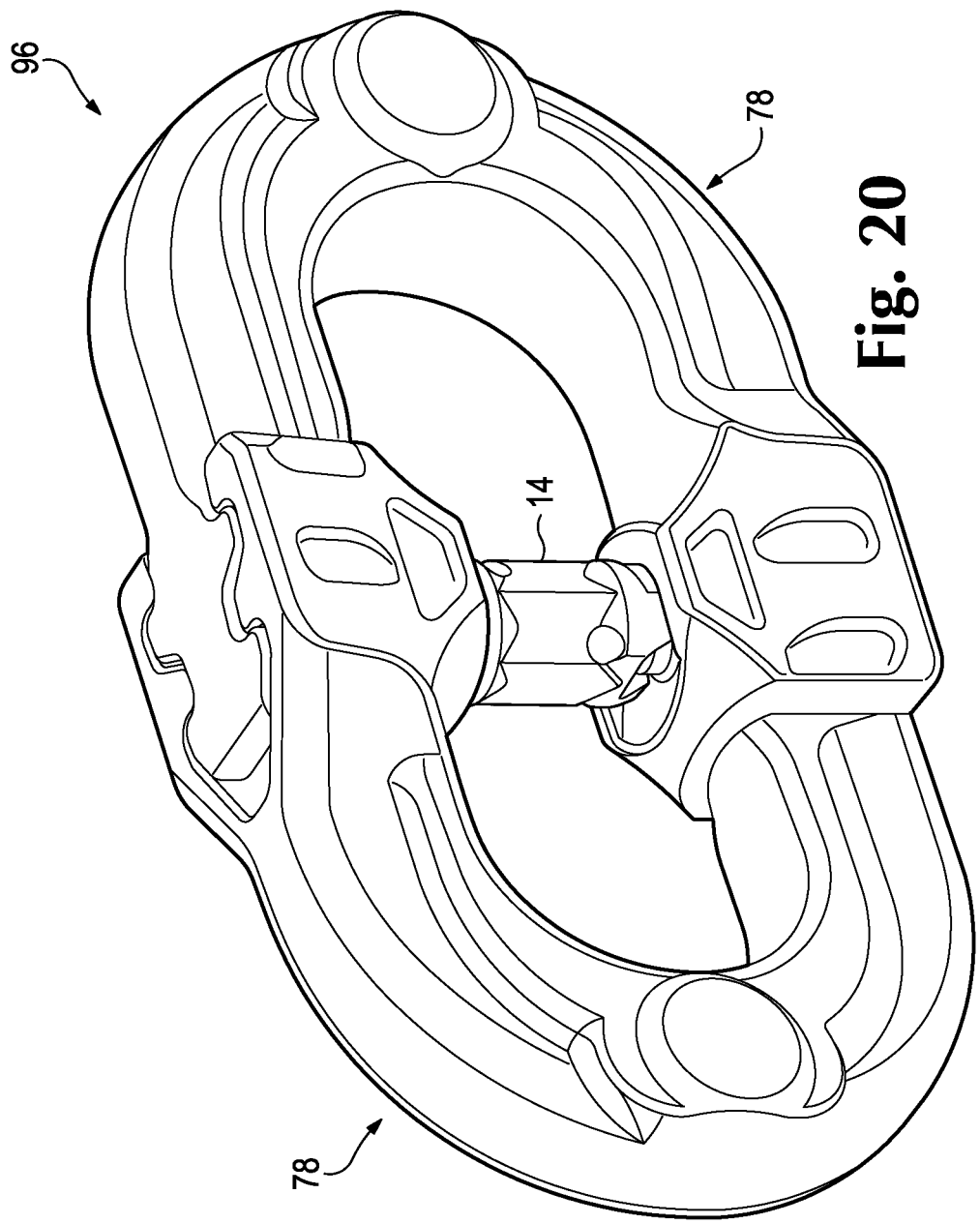
FIG. 20 is a side perspective view of a coupling link according to an exemplary embodiment of the invention, assembled from two link components as shown in FIG. 16 and the link support of FIG. 8.

Similar to the embodiment of FIGS. 1-11, the link component 78 shown in FIG. 16 is used in combination with link support 14. The end formations 42 of the link support 14 engages with a locking station 77 in the inner surface of the first end 76, and rotated 180 degrees. Locking station 77 is the same as locking station 38. The coupling link 96 resulting from interlocking link components 76 and inserting and engaging link support 14 is shown in FIG. 20. The link support 14 can be used with other link component designs having different coupling structures than shown herein.

Where the coupling or replacement link of the present disclosure is likely to be exposed to particularly harsh conditions, or suffer excessive wear due to abrasion, such as in a dragline mining operation, it may be advantageous to equip the coupling link with one or more wear caps or shrouds. Such wear caps may suffer damage and wear without compromising the structural integrity of the underlying coupling link. In addition, the one or more wear caps may be replaced as needed to further preserve the coupling link.

Figure 21:
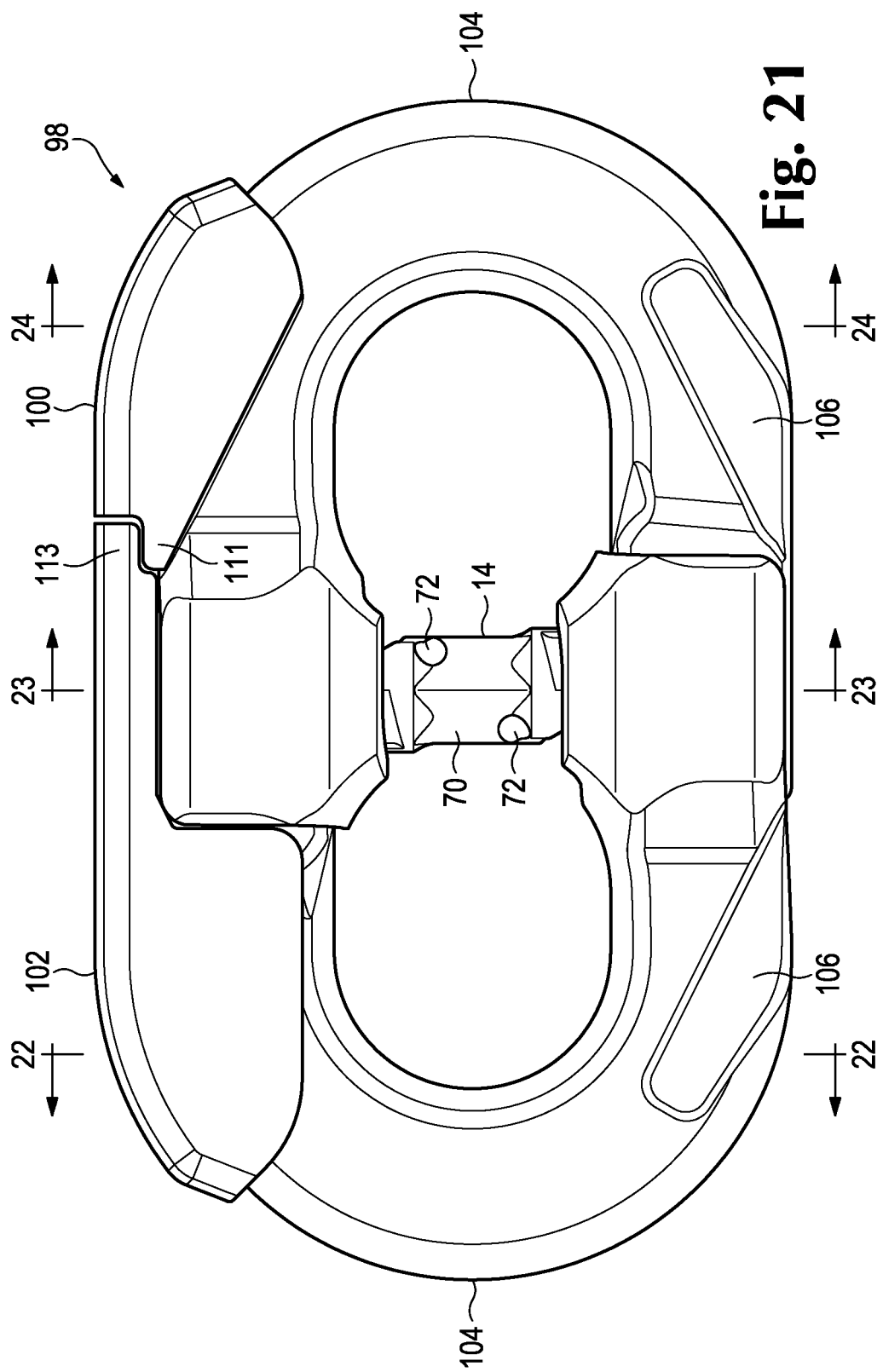
FIG. 21 is a side elevation view of a coupling link according to an exemplary embodiment of the invention, including wear caps on an outer surface of one of the legs of the link.
Figure 25:
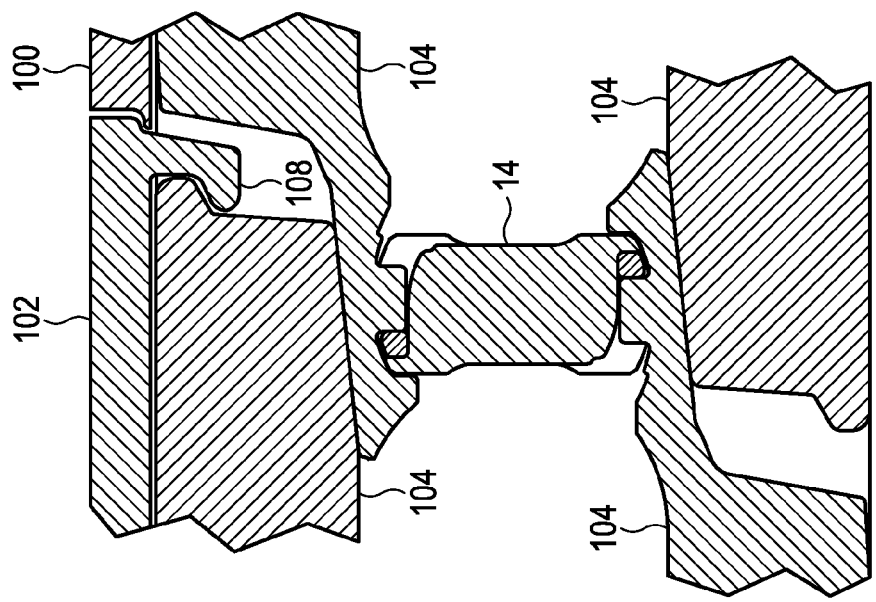
FIG. 25 is a partial sectional view along the symmetric mirror plane of the coupling link of FIG. 21.
Figure 24:
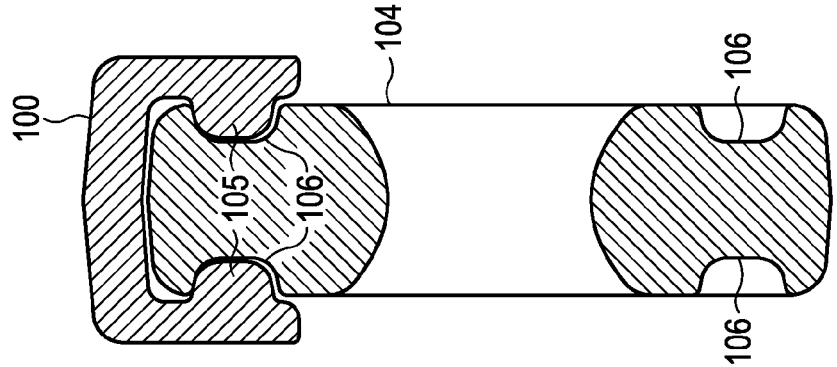
FIG. 24 is a sectional view along 24-24 of the coupling link of FIG. 21.
Figure 23:
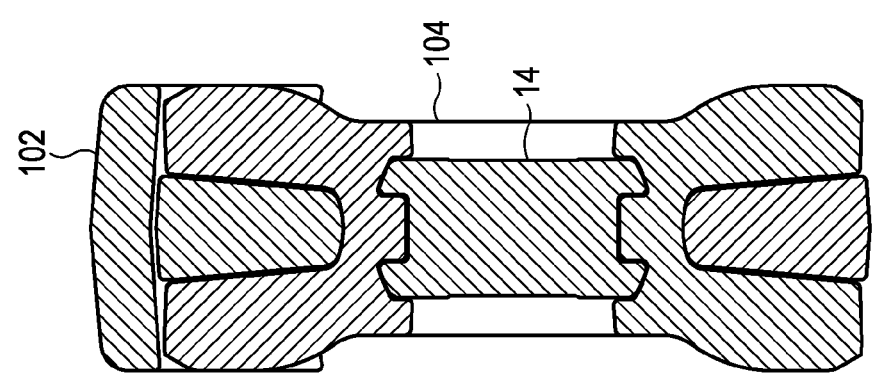
FIG. 23 is a sectional view along 23-23 of the coupling link of FIG. 21.
Figure 22:
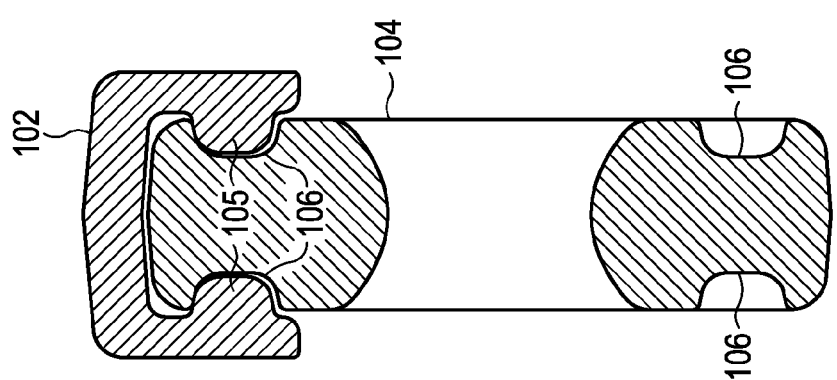
FIG. 22 is a sectional view along 22-22 of the coupling link of FIG. 21.

An example of a coupling link 98 equipped with wear caps is shown in FIG. 21. In this example, coupling link 98 has ends as shown for link component 78, but other constructions could be used. Attachment of the wear caps to the chain links is shown in the drawings as being attached to a coupling link, but it is not so limited. Wear caps may be attached to a chain link not subject to disassembly (such as cast links) as well as to coupling links as shown. When used with a coupling link, the wear caps are formed so they do not compromise the efficient function of the coupling link. The wear cap may be in the form of a single plate, or optionally applied to the link as multiple wear caps. In the coupling link of FIG. 21, the wear caps have been applied to the coupling link 98 as two individual wear caps 100 and 102, i.e., one on each link component 104. Sectional views of the coupling link 98 equipped with wear caps 100 and 102 are provided in FIGS. 22-25.

For the embodiments of FIGS. 21-31, each wear cap 100, 102 has at least a portion that is generally U-shaped having a channel 103 into which is received a portion of the link 16, and an exterior wear surface 107. The wear caps are each coupled to a link component 104 by slidably engaging projections 105 within channel 103 (i.e., on the interior surfaces 109) of wear caps 100, 102 into grooves 106 on the link components 104. Projections 105 are preferably the same size and shape as grooves 106. The projections could be formed on the link component and the grooves on the wear caps. In this construction, the grooves and projections are linear, but they could be curved. They could also have different orientations and/or shapes. FIG. 26, for example, shows a wear cap 100 in position to slidably engage link component 104 via one groove 106. Similarly, FIG. 27 shows wear cap 102 in position to slidably engage link component 104 via the other groove 106. Once the wear caps 100, 102 are installed on the respective link components 104, the link components are assembled together with link support 14 to define a complete link. A simple adhesive, small clips or any other means may be used to temporarily hold the wear caps to the link components during assembly of the coupling link 10 if necessary.

In the illustrated embodiment, wear cap 102 includes an arm 108 that grasps a shoulder 109 defined along end wall 111 of the link component 104 to provide additional support and resistance to being pulled from the link. Wear cap 102 then includes an outer ledge 113 that overlies an inner ledge on wear cap 100 to provide additional support to wear cap 100. With this interlocking relationship of the wear caps 100, 102, each wear cap is secured on its outer ends by channels 106 and on its inner end by arm 108 and the overlapping ledges 111, 113. The wear caps 100, 102 further abut one another when the link components 104 are assembled together to prevent release of projections 105 from channels 106. The wear caps can be removed and replaced by removing the link support and separating the link components. In some operations, wear caps would be desired along only one side (e.g., the side rubbing along the ground) as shown, but in other operations, wear caps would be provided on both sides 20. Of course, wear caps could be omitted on any of the links in accordance with aspects of the present invention.

Other wear cap arrangements are possible. For example, arm 108 could be omitted such that the overlapping and abutting of the wear caps holds the wear caps in place. Moreover, the wear caps could also simply abut without any overlapping ledges. The channels 106 could be projections that are received into grooves on the underside of the wear caps. A retainer (not shown), could be installed separately or integral with one or both wear caps, or could be used to secure the abutting ends of the wear caps together. The use of a retainer would be needed with a chain link that is not subject to disassembly. The wear caps could be identical. The wear cap could be a single piece for each side of the link. In such a case, the retainer (in the form of a pin or other means) would be used to secure the wear cap to the link.

In another alternative, mounting formations 63 define outwardly-extending rails 67 for mounting wear caps 121, 123 (FIG. 1). In this arrangement, wear caps 121, 123 (FIG. 32) can be mounted on link 16. In this embodiment, each wear cap 121, 123 has at least a portion that is generally U-shaped to define a channel 125 into which a portion of the link 16 is received. Mounting formations, which in this embodiment, are formed as inwardly extending projections or rails 127 that underlie rails 67 to resist removal of the wear cap away from the link. In this embodiment, the inner end 129 of wear cap 123 abuts and overlaps the inner end 131 wear cap 121 to hold wear cap 111 on the link 16. Wear cap 123 is held in place by a pin or lock (not shown) that secures the wear cap 123 to the respective link component (such as by having aligned holes in the wear cap and link component), or to the adjacent wear cap 121.

Figure 28:
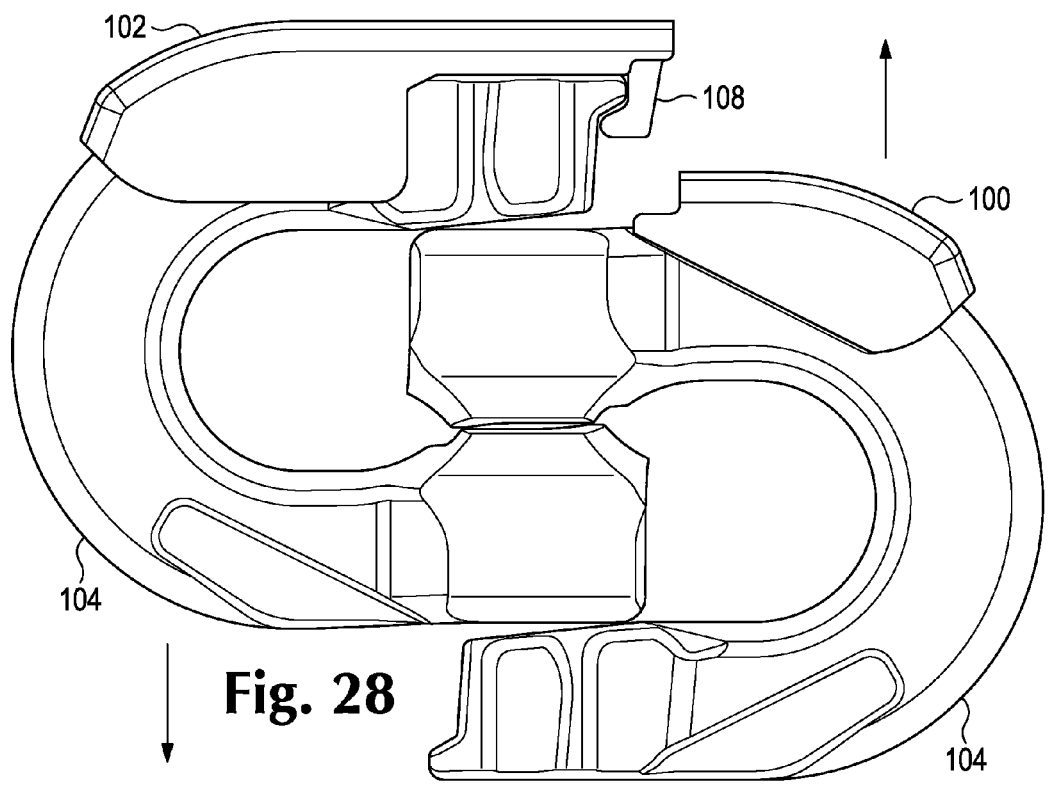
FIG. 28 is a side elevation view of the link components and wear caps of FIGS. 26 and 27 prior to being interlocked.
Figure 29:
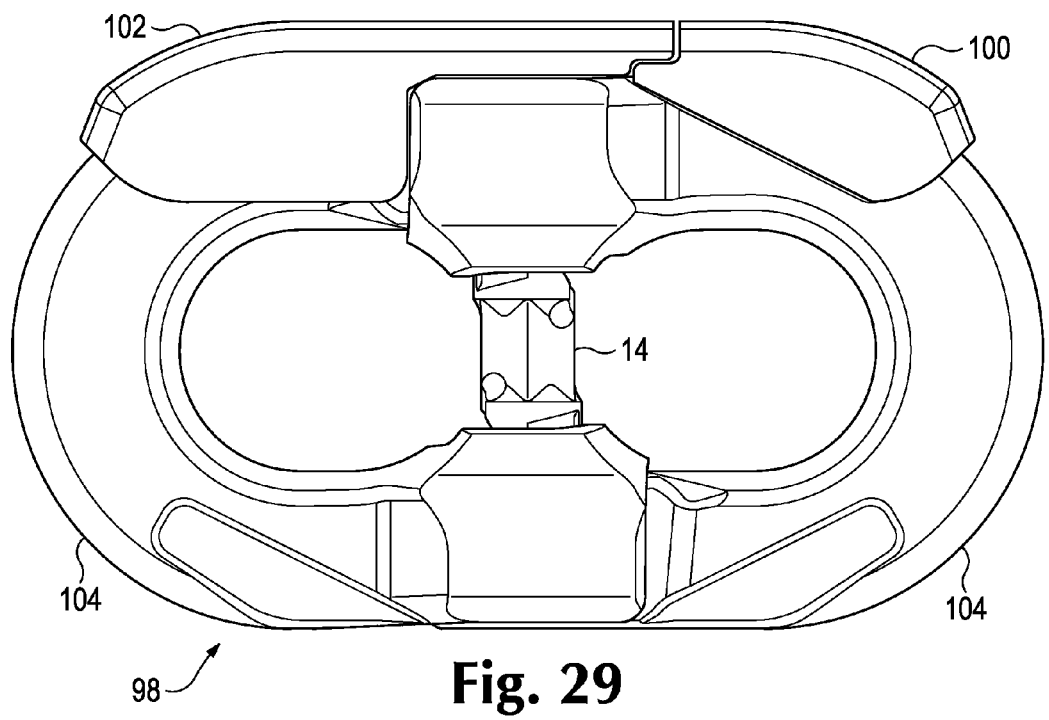
FIG. 29 is a side elevation view of a coupling link with wear caps installed incorporating a link support and the link components and partial wear caps of FIGS. 26 and 27.
Figure 30:
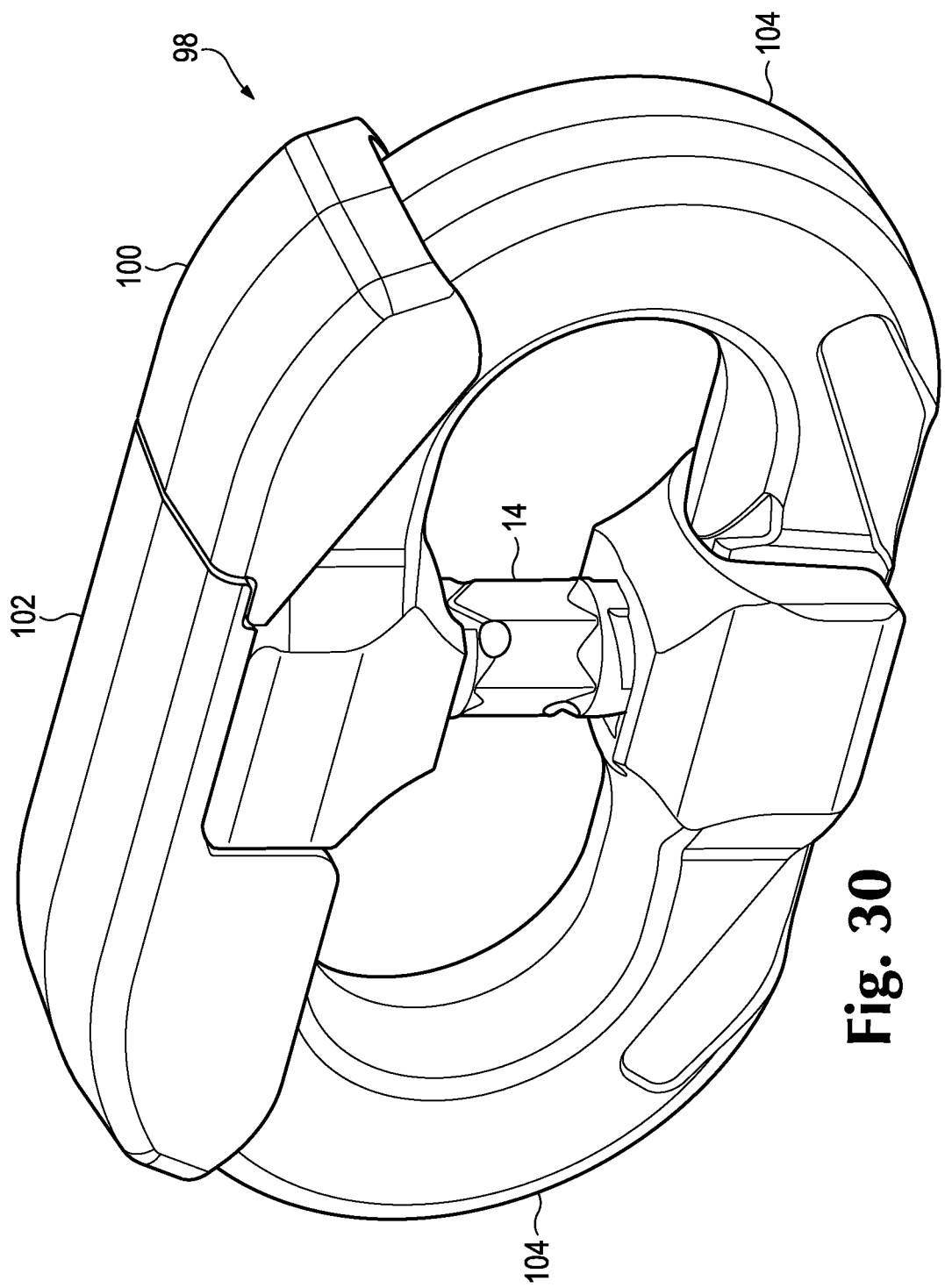
FIG. 30 is a perspective view of the coupling link of FIG. 29.
Figure 31:
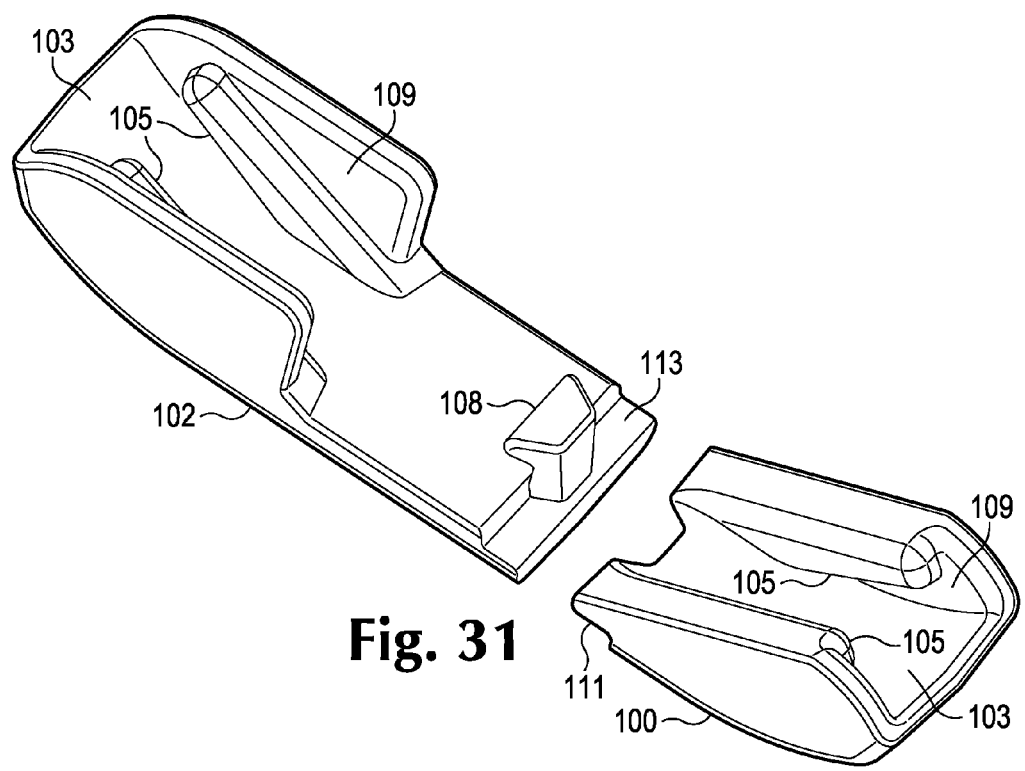
FIG. 31 is a perspective view of the wear caps shown in FIGS. 21-30.

The wear caps are not permanently fixed to their respective link components; rather, they are removable in order to facilitate replacement of the wear caps when worn to extend the usable life of the chain. When mounted on a coupling link with interlocking link components, as shown in FIG. 28, wear caps 100 and 102 can be interlocked with the resulting link, as well as each other, when the link is assembled. This is most clearly shown in the sectional view of FIG. 25, which shows a retaining arm 108 of wear cap 102 that extends between link components 104, away from the wear surface. At the same time, wear cap 100 is locked into place, i.e., wear cap 100 is prevented from slidably disengaging from link component 104 by the presence of wear cap 102. The resulting coupling link, equipped with wear caps 100 and 102 is shown in FIG. 30. Alternatively, as noted above, a retainer, such as a pin or lock, could be used to secure wear caps together at the position where they meet to hold the wear caps on a chain link or coupling link. The wear caps could alternatively be secured directly to the link.

The present invention is also directed to a chain that includes two chain segments, each having a plurality of chain links ending in a terminal link, where the two chain segments are interconnected at the terminal links by a coupling link as described herein. In this environment, links in accordance with the present invention are used in a new chain, not just in a repair function.

Additionally, the coupling links disclosed herein are particularly well-suited for methods of repairing a chain segment, or coupling two chain segments, by using a coupling link of the present disclosure. Such a method typically includes a) providing a link support, the link support having a central base and two ends; b) providing two link components, each link component having a first end and a second end, where the first end is configured to interlock with the second end of the other link component by engaging the first end of each link component with the second end of the other link component; and the inner surface of each first end includes a locking station that is configured to secure an end formation of the link support; b) interlocking the two link components by engaging the first end of each link component with the second end of the other link component to form a contiguous link having two semi-circular ends and two parallel sides; and c) rotating the link support around a transverse axis within the interior space defined by the contiguous link until each end formation engages the corresponding locking station in the inner link surface of each first end, followed by a rotation of the link support by about 180 degrees around its longitudinal axis to engage each end formation within its corresponding recess.

The link components, link supports, and coupling links described herein permit the repair of a broken chain strand by replacing the broken link with a mechanically attached link without the use of a hammer or special tools. If desired, the link components can be welded to produce a more permanent repair. In use, each link component is put through one of the adjoining links of the remaining chain strand, and then one link slides over the other link to form a finished union. The link support can be installed from either side of the link assembly, and turned either clockwise or counter clockwise to secure the lock to the assembly. Once locked in place, the link support obstructs translation of the link components, holding the assembly together. An elastomeric block helps hold the link support in position by locking a tab within a notch, inhibiting rotation of the link support. The tab may be removed from the notch by rotating either clockwise or counter clockwise. The links are readily disassembled by translating the link components until the ends of the link components disengage.

The coupling links of this invention provide enhanced value to the end user. For example, the various embodiments of the coupling links according to the invention, provide one or more (but not limited to) the following benefits: Increased wear life; resist external rail wear and internal bite wear; smooth outer profile that will not catch on, e.g., a bucket; use of an interior support that helps prevents chain tangling; a safer, simple, hammerless assembly and removal process; reliable and predictable assembly, disassembly and operation; avoidance of sudden failures; the ability to fit into any location of the chain strand without obstructing articulation; the ability to fit into one size larger and size smaller chain link; the ability to be flipped and/or rotated to produce more even wear; light weight; can be used as a temporary repair link or for long term service; reduces or eliminates the need for rigging or bucket change to reduce rub link wear; reduces chain strand lead time and cost if used in chain production; can use two identical link halves to reduce pattern costs and inventory; use of angled, interlocking fingers with axial supports that are strong, easy to assemble and robust to wear; interlocking fingers are located along the neutral axis of the link, which reduces stress; thin median web to add strength without greatly reducing contact surface area, which reduces surface deformation and stress; centered location of interlocking features that allows freedom of movement for the adjoining links; link support that is out of the wear path and prevents tangling of the chain strand; easy locking with installation of a single link support; increased wear life with replaceable wear caps; less discarded material with replaceable wear caps; simple use of wear caps that are retained by the lock for the link components; hammerless assembly and disassembly; identical components and reusable lock member for easy installation and removal; and intuitive, easy-to-install mechanism for workers in the field.

The coupling links of the present invention may serve several different purposes. One such purpose is to replace a broken link. Another purpose is to allow an entire chain to be detached and reattached to equipment. For example, a replaceable link at each end of a chain will allow that chain to be used in a first orientation for a certain amount of time, and then rotated to a second orientation for further use.

The disclosed coupling links are field-replaceable links, with components and locking elements that collectively are particularly efficient from a weight-versus-strength perspective. For example, a version of coupling link 10 may weigh 280 pounds, and yet it might be used effectively with a 300-pound in situ molded link. This 280-pound version of the present chain link is relatively durable, often lasting for approximately 50% of the lifespan of the corresponding 300-pound in-situ molded link.

The disclosed components and locking element are relatively easy to interconnect and lock. In particular, the locking element preferably is a single, integral piece, easily handled and manipulated in the field. Furthermore, the locking element includes multiple tool interfaces, so that different types of tools may be used, depending on whether a wrench or a pry bar is readily available. The locking element itself is designed for manipulation by one or two workers, with visual indicators to help properly align the components. Once installed, the locking element is extremely robust, and may be used without requiring welding or other fixing of the locking element relative to the primary link components.

An optional added feature of the present chain link is the addition of a field-removable wear cap or wear caps, which is mechanically attached to the components of the link, and may be held in place with or without requiring any additional locks or tools. The locking element of the removable chain link holds the wear cap in place, when the primary components of that chain link are locked together. The present wear cap may add up to 20% or more to the weight of the replaceable chain link, depending on the desired thickness of the wear caps.

The disclosed coupling link provides a combination of an excellent weight-to-strength ratio, easy installation and removal in the field, quick installation and removal of added wear caps, and other features discussed above, provides a replaceable chain link that may be used both as an emergency repair link, and as part of original equipment. For example, the present removable chain link may be used to modularize existing dragline chains, so that predefined lengths of chain may be matched with different buckets or different lifting equipment, as needed. Furthermore, by providing several different sizes of the present removable chain-link, smaller existing chain may be matched with a larger attachment point, or vice versa, as needed.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The invention claimed is:

1. A coupling link comprising:
a pair of link components, each link component having a pair of ends such that the ends of one link component complements and engages the ends of the other link component to define an enclosed link, and opposing surfaces of the engaged ends each defining an inwardly directed post; and
a link support having a pair of opposite ends, each said end having an opening with an inlet to receive the post, the link support being rotatable about the post between a secured condition where the link support prevents disengagement of the engaged pair of link components and a release condition where the link support can be installed and removed from the engaged pair of link components.

2. A coupling link in accordance with claim 1 including lock structures on at least one locking station and at least one of the ends of the link support that engage and hold the link support to the engaged link components when the link support is in the secured condition.

3. A coupling link in accordance with claim 2 wherein the lock structures include at least one complementary tab and indentation.

4. A coupling link in accordance with claim 1 wherein each of the opposing surfaces of the engaged ends of the link components includes a support wall around the post to support the engaged link support, and an opening in the support wall to receive the respective end of the support into the locking station.

5. A coupling link in accordance with claim 1 wherein the link support includes tool-receiving means for rotating the link support between the secured condition and the release condition.

6. A coupling link in accordance with claim 1 wherein each link component includes a removable wear cap that is mechanically connected to the respective link component.

7. A coupling link in accordance with claim 1 wherein one end of each pair of engaged ends of the link components has a hooked connecting element bisected by a ridge, and the other end of each pair has a hooked connecting element bisected by a slot to receive the ridge.

8. A coupling link in accordance with claim 1 wherein each said end of each said link connector includes a hooked bearing element, a recess associated with the hooked bearing element, and at least one axial support across the recess to connect the body and the hooked bearing element.

9. A coupling link in accordance with claim 8 wherein the axial support bisects the recess on one end, and the axial support extends to each side of the recess on the other end.

10. A coupling link in accordance with claim 1 wherein each link component is identical.

11. A coupling link comprising:
a pair of link components, each link component having a locking station, and a pair of ends such that the ends of one link component complements and engages the ends of the other link component to define an enclosed link; and
a link support insertable into the link and connecting to the engaged ends of the link components so that each end of the link support is inserted and seated in one of the locking stations without a hammer and the locking station resists unwanted movement of the link support without a subsequently installed retainer to prevent disengagement of the link components during use.

12. A coupling link in accordance with claim 11 wherein each said locking station has an inwardly directed post, and each said link support end has an opening with an inlet to receive the post, the opening is defined by a support wall to confine the received post in directions otherthan the inlet, and the link support is rotatable about the post to lock and release the link support from the engaged pair of links.

13. A coupling link in accordance with claim 12 wherein each locking station includes a support wall around the post to support the engaged link support, and an opening in the support wall to receive the respective end of the support into the locking station.

14. A coupling link in accordance with claim 12 wherein the link support includes tool-receiving means for rotating the link support.

15. A coupling link in accordance with claim 11 wherein each link component includes a removable wear cap that is mechanically connected to the link component.

16. A coupling link in accordance with claim 15 wherein each wear cap abuts an opposing wear cap on the same side when the link components are assembled together.

17. A coupling link in accordance with claim 11 wherein one end of each pair of engaged ends of the link components has a hooked connecting element bisected by a rib, and the other end of each pair has a hooked connecting element bisected by a slot to receive the rib.

18. A coupling link in accordance with claim 11 wherein each said end of each said link connector includes a hooked bearing element, a recess associated with the hooked bearing element, and at least one axial support across the recess to connect the body and the hooked bearing element.

19. A coupling link in accordance with claim 11 wherein each link component is identical.

20. A coupling link comprising:
a pair of link components, each link component having a pair of ends such that the ends of one link component complements and engages the ends of the other link component to define an enclosed link, opposing surfaces of the engaged ends each defining a locking station; and
a link support having a pair of opposite ends through which a first axis extends, the opposite ends being engaged with the locking stations by successively rotating the link support about a second axis transverse to the first axis and then about the first axis.

21. A coupling link in accordance with claim 20 wherein each of the engaged ends of the link components includes a locking station that engages one end of the link support, each said locking station having an inwardly directed post, and each said link support end has an opening with an inlet to receive the post, the opening is defined by a support wall to confine the received post in directions other than the inlet, and the link support is rotatable about the post to lock and release the link support from the engaged pair of links.

22. A coupling link in accordance with claim 21 wherein each locking station includes a support wall around the post to support the engaged link support, and an opening in the support wall to receive the respective end of the support into the locking station.

23. A coupling link in accordance with claim 20 wherein the link support includes tool-receiving means for rotating the link support.

24. A coupling link in accordance with claim 20 wherein each link component includes a removable wear cap that is mechanically connected to the link component.

25. A coupling link in accordance with claim 20 wherein one end of each pair of engaged ends of the link components has a hooked connecting element bisected by a ridge, and the other end of each pair has a hooked connecting element bisected by a slot to receive the ridge.

26. A coupling link in accordance with claim 20 wherein each link component is identical.

27. A coupling link comprising a pair of link components, each link component having a pair of ends such that the ends of one link component complements and engages the ends of the other link component to define an enclosed link, one end of each pair having a hooked connecting element bisected by a ridge, and the other end of each pair having a hooked connecting element bisected by a slot to receive the ridge.

28. A coupling link in accordance with claim 27 including a link support extending between the engaged ends of the link components to hold the link components together.

29. A coupling link in accordance with claim 28 wherein each of the engaged ends of the link components includes a lacking station that engages one end of the link support, each said locking station having an inwardly directed post, and each said link support end has an opening with an inlet to receive the post, the opening is defined by a support wall to confine the received post in directions other than the inlet, and the link support is rotatable about the post to lock and release the link support from the engaged pair of links.

30. A coupling link in accordance with claim 28 wherein each locking station includes a support wall around the post to support the engaged link support, and an opening in the support wall to receive the respective end of the support into the locking station.

31. A coupling link in accordance with claim 28 wherein the link support includes tool-receiving means for rotating the link support.

32. A coupling link in accordance with claim 27 wherein each link component includes a removable wear cap that is mechanically connected to the link component.

33. A coupling link in accordance with claim 27 wherein the link components are identical.

34. A coupling link comprising a pair of link components, each link component having body defining a partial link and a pair of connectors such that the connectors of one link component complements and engages the connectors of the other link component to define an enclosed link, each said connector including a hooked bearing element, a recess associated with the hooked bearing element, and at least one axial support across the recess to connect the body and the hooked bearing element.

35. A coupling link in accordance with claim 34 wherein the axial support bisects the recess on one end, and the axial support extends to each side of the recess on the other end.

36. A coupling link in accordance with claim 34 including a link support extending between the engaged ends of the link components to hold the link components together.

37. A coupling link in accordance with claim 36 wherein each of the engaged ends of the link components includes a locking station that engages one end of the link support, each said locking station having an inwardly directed post, and each said link support end has an opening with an inlet to receive the post, the opening is defined by a support wall to confine the received post in directions other than the inlet, and the link support is rotatable about the post to lock and release the link support from the engaged pair of links.

38. A coupling link in accordance with claim 37 wherein each locking station includes a support wall around the post to support the engaged link support, and an opening in the support wall to receive the respective end of the support into the locking station.

39. A coupling link in accordance with claim 38 wherein the link support includes tool-receiving means for rotating the link support.

40. A coupling link in accordance with claim 34 wherein each link component includes a removable wear cap mechanically connected to the link component.

41. A chain link comprising opposite curved ends and opposite sides interconnecting the curved ends to generally define an enclosed loop, the enclosed loop having an interior surface and an exterior surface, and at least one removable wear cap mechanically attached to the chain link to substantially cover a span of the exterior surface of the chain link to extend the wear life of the chain link and accommodate replacement of the wear cap when worn.

42. A chain link in accordance with claim 41 wherein the wear cap and the body each include a mounting formation that engages the other mounting formation to hold the wear cap to the body.

43. A chain link in accordance with claim 41 including a pair of wear caps, the body defining a mounting formation for each wear cap, and each wear cap defining a retention formation to complement and receive the mounting formation of the body.

44. A chain link in accordance with claim 43 wherein the wear caps abut each other when assembled to the body.

45. A chain link in accordance with claim 41 including a pair of link components held together by a removable link support.

46. A chain link in accordance with claim 41 wherein the at least one said removable wear cap is mechanically attached to a side of the body.

47. A chain link in accordance with claim 46 wherein the wear cap and the body each include a mounting formation that engages the other mounting formation to hold the wear cap to the body.

48. A chain link in accordance with claim 46 including a pair of wear caps, the body defining a mounting formation for each wear cap, and each wear cap defining a retention formation to complement and receive the mounting formation of the body.

49. A chain link in accordance with claim 48 such that when the mounting formation receives the pair of wear caps, the pair of removable wear caps abut each other.

50. A chain link in accordance with claim 49 wherein the mounting formation on the body has projections or grooves and the retention formation on the pair of wear caps has complimentary grooves or projections so that the complimentary grooves and projections are engaged to hold the wear caps to the body.

51. A chain link in accordance with claim 50 including a pair of link components held together by a removable link support.

52. A chain link in accordance with claim 41 wherein the body defines a mounting formation for the wear cap, and the wear cap defines a retention formation to complement and receive the mounting formation of the body.

53. A chain link in accordance with claim 52 wherein at least a portion of the mounting formation defines outwardly-extending rails and at least a portion of the retention formation has a channel to receive the outwardly-extending rails.

54. A wear cap for a chain link comprising a generally U-shaped body having a channel open on opposite ends to receive the chain link, the wear cap having a length that extends from one open end to the other open, end an exterior wear surface defining an outer portion of the U-shaped body, the wear surface having a convex shape in a direction generally along the length of the wear cap, and a mounting structure within the channel to couple to a complementary mounting structure on the chain link to hold the wear cap to the chain link.

55. A wear cap in accordance with claim 54 wherein the mounting structure projects into the channel for receipt within a groove in the chain link.

56. A method of assembling a coupling link including a pair of link components each having a pair of legs, and a connector on an end of each leg, the method comprising securing the connectors of the two link components together to form an enclosed link, inserting a link support within the enclosed link such that opposite ends of the link support contact the engaged connectors of the link, and rotating the link support about the longitudinal axis of the link support to secure the link support within the enclosed link and prevent release of the link components.

57. A method in accordance with claim 56 wherein each link component has a locking station and each end of the link support is seated on one of the locking stations and rotated about the axis so that the locking stations couple the link support to the link components.

58. A method link in accordance with claim 57 wherein once the link support is installed in the locking stations, the locking stations resist unwanted movement of the link support without a subsequently installed retainer.

59. A method of assembling a coupling link including a pair of link components each having a pair of legs, an end to interconnect the legs, and a connector on the end of each leg, the method comprising securing the connectors of the two link components together to form an enclosed link, inserting a link support within the enclosed link such that opposite ends of the link support contact the engaged connectors of the link, and rotating the link support about a transverse axis that is perpendicular to the longitudinal axis of the link support to bring the ends of the link support into contact with the engaged ends of the link components and rotating the link support about the longitudinal axis of the link support to secure the link support within the enclosed link.

* * * * *